US006457361B1

(12) United States Patent
Takeuchi et al.

(10) Patent No.: US 6,457,361 B1
(45) Date of Patent: Oct. 1, 2002

(54) MASS SENSOR AND MASS SENSING METHOD

(75) Inventors: Yukihisa Takeuchi, Nishikamo-gun (JP); Takao Ohnishi, Nishikasugai-gun (JP); Koji Kimura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/387,012

(22) Filed: Aug. 31, 1999

(30) Foreign Application Priority Data

| Sep. 4, 1998 | (JP) | 10-251166 |
| Mar. 5, 1999 | (JP) | 11-059503 |
| Jul. 27, 1999 | (JP) | 11-212171 |

(51) Int. Cl.⁷ .............................................. G01H 13/00
(52) U.S. Cl. ..................... 73/580; 73/24.06; 435/287.2
(58) Field of Search ............................. 73/24.06, 32 A, 73/54.41, 64.53, 580, 514.29, 702, 704; 435/287.2

(56) References Cited

U.S. PATENT DOCUMENTS 4,789,804 A   12/1988   Karube et al. ............... 310/311

FOREIGN PATENT DOCUMENTS

| EP | 0 614 087 | 9/1994 |
| EP | 0 764 850 | 3/1997 |
| FR | 2 739 190 | 3/1997 |

OTHER PUBLICATIONS

"Denki Kagaku", 53, No. 1 (1985), pp. 63–68 by Kazuo Anzai.

*Primary Examiner*—John E. Chapman
(74) *Attorney, Agent, or Firm*—Burr & Brown

(57) ABSTRACT

A mass sensor including: a connecting plate having one or more slit(s) and/or opening portion(s) formed therein and/or having a thin-walled portion and a thick-walled portion formed therein; a diaphragm joined with the connecting plate at respective side surfaces; a piezoelectric element; a sensing plate with the piezoelectric element being provided at least at one part on at least one surface of the sensing plate, which has its side surface joined with a side surface of the connecting plate in the direction perpendicular to the joining direction of the diaphragm and the connecting plate; and a sensor substrate with which at least a part of side surfaces of the connecting plate as well as the sensing plate are joined, and the diaphragm, the connecting plate, the sensing plate, and the piezoelectric element form a resonating portion. The mass sensor can conveniently be used for determining the mass of a substance to be sensed by measuring changes in resonant frequencies caused by changes in the mass of the diaphragm on which a catching substance for catching a substance to be sensed by reacting only with the object of sensing is applied.

107 Claims, 15 Drawing Sheets

FIG. 12 (a)
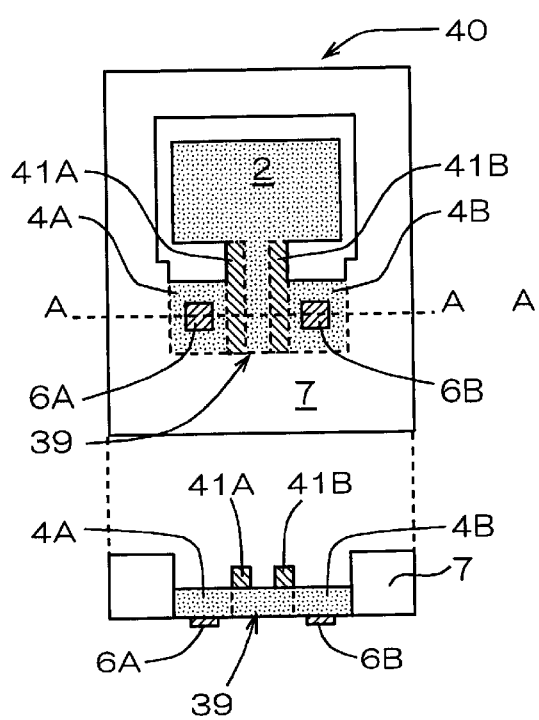
FIG. 12 (b)
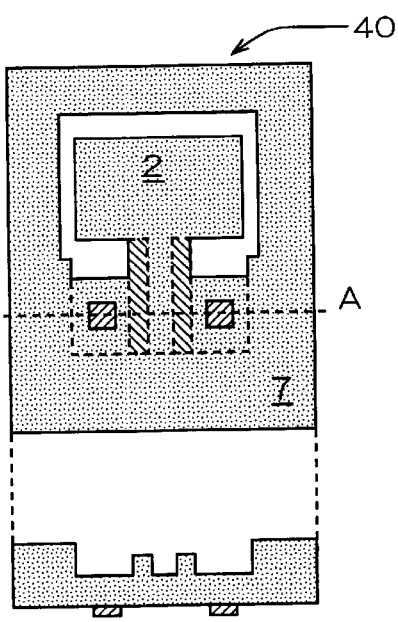
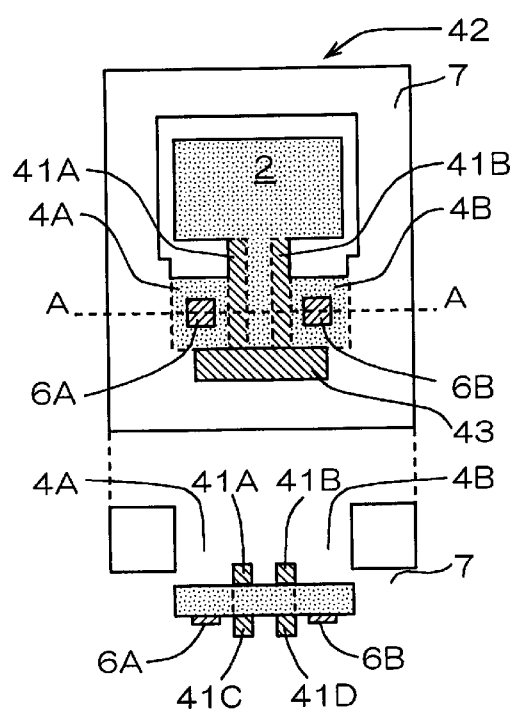
FIG. 13 (a)
FIG. 13 (b)

FIG. 26
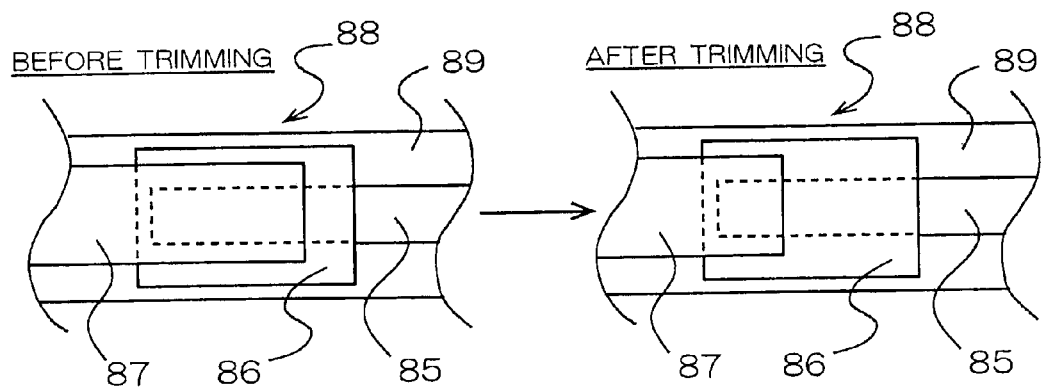
FIG. 27
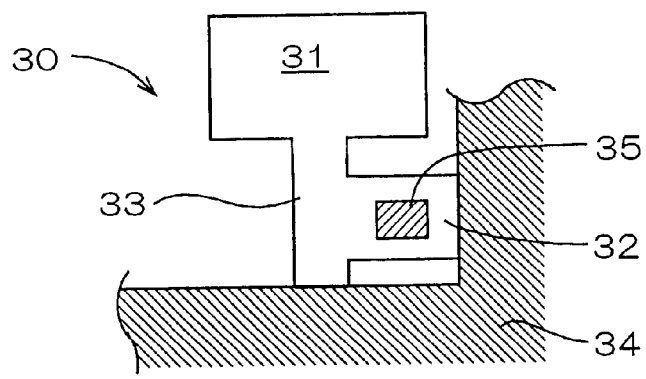
FIG. 28 - Prior Art
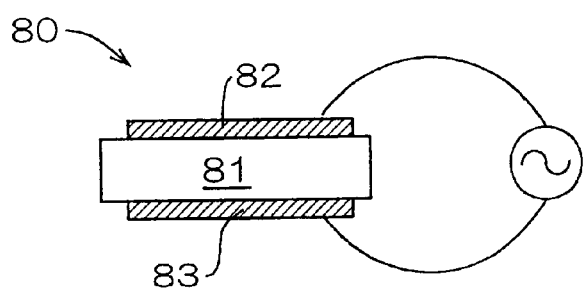

FIG. 29 - Prior Art
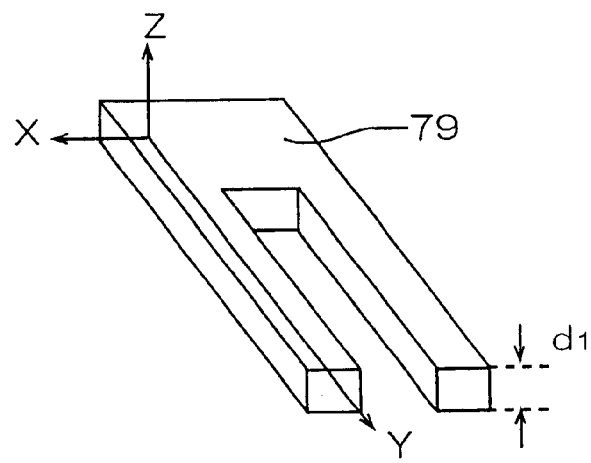
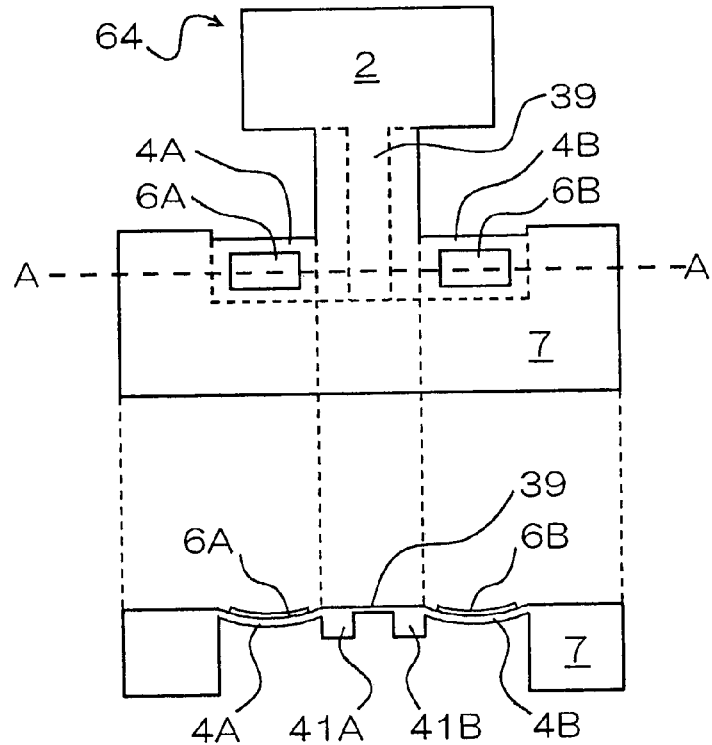
FIG. 30(a)
FIG. 30(b)

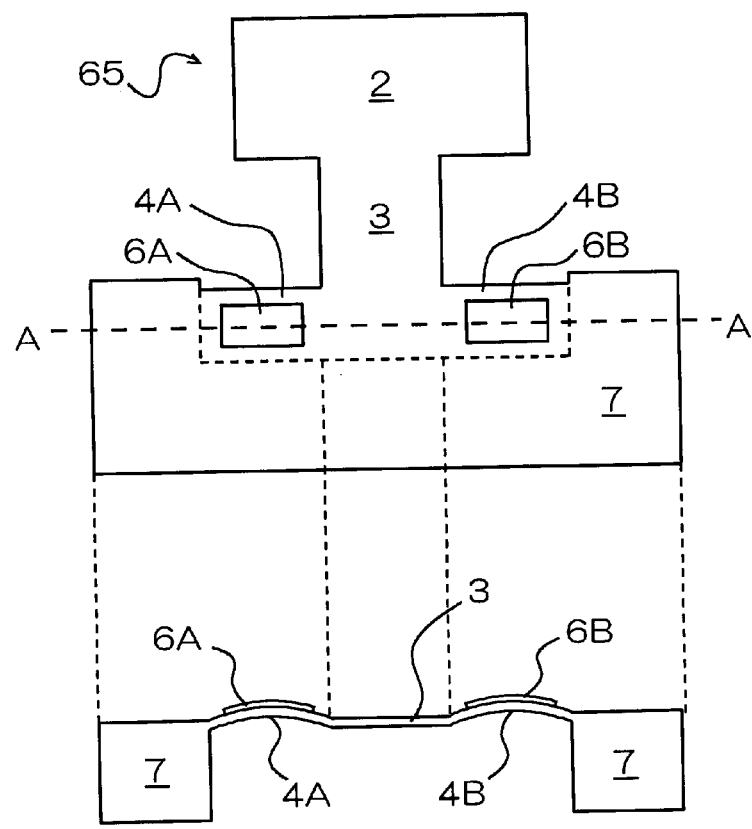
FIG. 31(a)
FIG. 31(b)
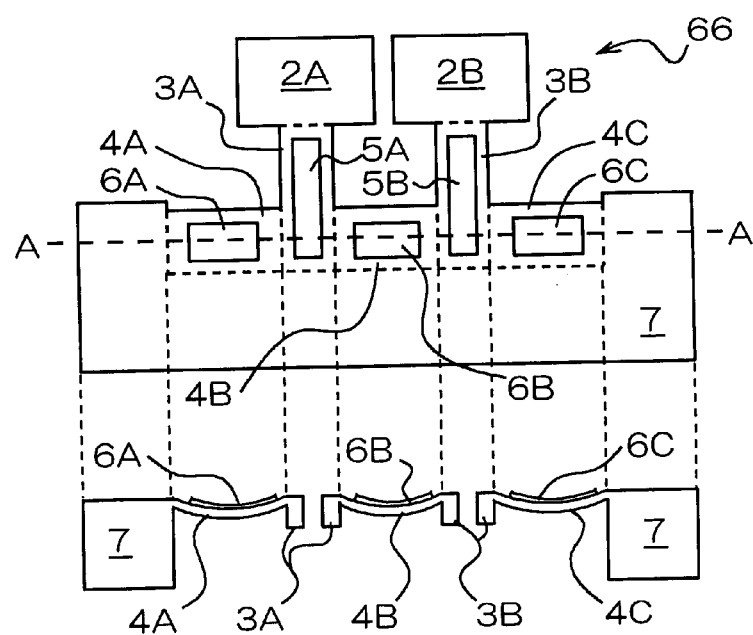
FIG. 32(a)
FIG. 32(b)

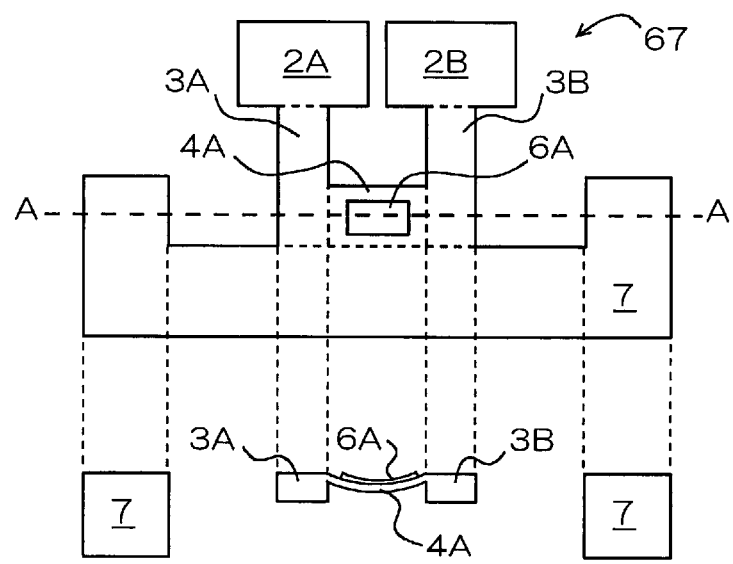
FIG. 33(a)
FIG. 33(b)
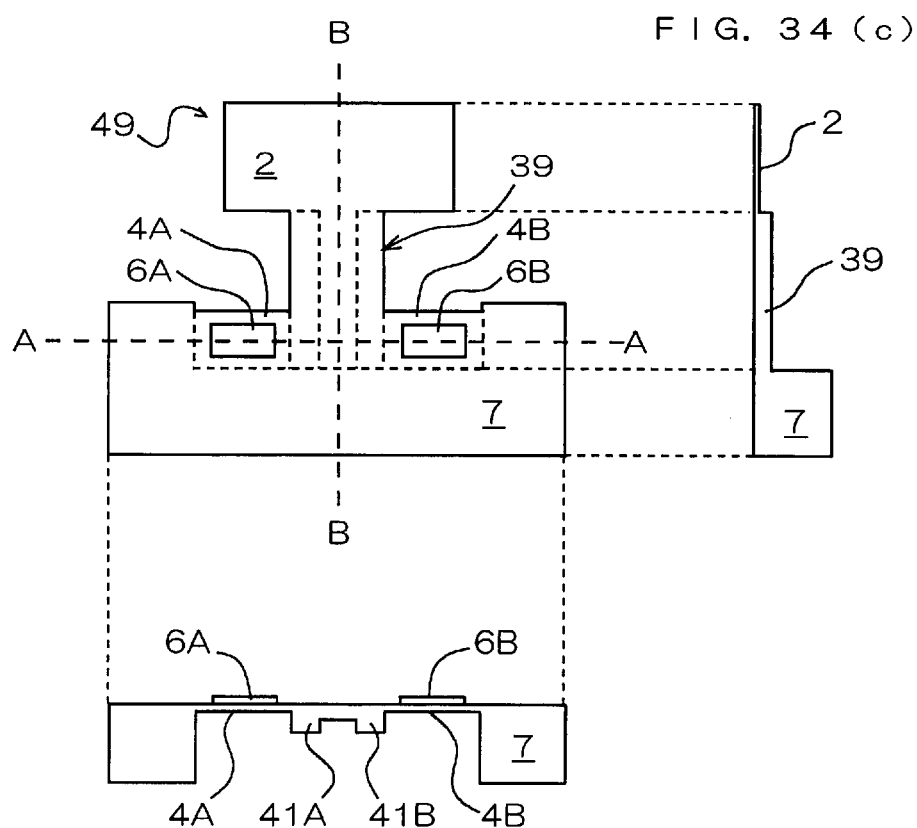
FIG. 34(a)
FIG. 34(c)
FIG. 34(b)

MASS SENSOR AND MASS SENSING METHOD

BACKGROUND OF THE INVENTION AND RELATED ART STATEMENT

The present invention relates to a mass sensor for determining a minute mass of a nanogram ($10^{-9}$ g) order, for example, a mass sensor for sensing microorganisms such as bacteria, viruses, and protozoa (immune sensor), and a mass sensor for sensing moisture, toxic substances, or specific chemical substances such as taste components (moisture meter, gas sensor, and taste sensor), and a method for sensing a mass. In particular, the present invention relates to a mass sensor conveniently used for determining the mass of a substance to be sensed by measuring change in resonant frequencies caused by change in the mass of a diaphragm on which a catching substance for catching a substance to be sensed by reacting only with the object to be sensed is applied, and a method for sensing a mass.

Since the mass sensor of the present invention is not limited to the measurement of change in the mass of the catching substance applied on a diaphragm as described above, that is, not limited to the indirect measurement of change in the mass of a diaphragm, but it is naturally possible to sense change in resonant frequency due to change in the mass of the diaphragm itself, the mass sensor can also be used as a thickness meter for vapor-deposited films or a dew indicator.

Furthermore, even if the mass of the diaphragm is not changed directly or indirectly, the mass sensor of the present invention can also be used as a vacuum gauge, a viscosity meter, or a temperature sensor by placing it in an environment to cause a change in the resonant frequency thereof, that is, by placing it in a medium environment of gases or liquids having different degrees of vacuum, viscosity, or temperature.

Thus, although the mass sensor of the present invention can be used in various applications depending on its embodiments, the same basic principle is also applied to the measurement of change in resonant frequencies of the diaphragm and the resonating portion including the diaphragm.

Recent progress of scientific and medical technologies, and newly developed pharmaceuticals such as antibiotics and chemotherapy drugs have enabled the treatment of various diseases heretofore considered to be difficult to treat. Among what are referred to as diseases, microorganism examinations are essential for the treatment of diseases caused by microorganisms such as bacteria, viruses, or protozoa, to find their pathogens, to clarify their types, and to determine drugs to which they are sensitive.

At present, in the first stage of microorganism examinations, since the cause of a disease and the type of the pathogen can be estimated from the symptoms, various specimens, such as blood, are selected depending on the type of the disease, pathogens present in the specimens are morphologically identified, or antigens or the specific metabolites of pathogens (e.g., toxins or enzymes, etc.) existing in the specimens are immunochemically identified. These processes include smeartest, staining, or microscopy used in bacterioscopy, and in recent years, instantaneous identification has become possible by fluorescent antibody staining or enzymatic antibody staining.

Furthermore, the virus serological test, recently used in the detection of viruses, is a method for proving the presence of specific immunity antibodies that appear in the serum of a patient. Examples of the method include the complement fixation reaction in which the presence of antibodies or antigens is determined by adding complements to test blood, and by observing whether the complements react with antigens or antibodies in the blood and fix to the cell membranes of the antigens or antibodies, or destroy the cell membranes.

Except extremely special cases where symptoms have not been seen heretofore, and the disease is caused by a new pathogen which has not been discovered, in the treatment of diseases caused by microorganisms or the like, adequate treatment can be conducted by finding pathogens in an early stage through the microorganism test described above, and the patient can be led to recovery without worsening of the symptoms.

However, with methods such as smeartest, staining, and microscopy, the detection of microorganisms is often difficult depending on their quantities, and time-consuming treatment such as the culture of specimens on an agar is required at need. Also in the virus serological test, since measurements must be performed as a rule during both the acute stage and the convalescent stage for determination from the movement of the quantities of antibodies, there is the problem of time consuming from the point of view of prompt diagnosis.

As seen in the complement fixation reactions described above, when a substance to be sensed reacts with a catching substance which catches the substance to be sensed by reacting only with the specific substance to be sensed, microorganisms, the mass of the catching substance increases by the mass of the substance to be sensed, even slightly. Such an increase in the mass similarly occurs in the relationship between a catching substance (adsorbing substance) and a chemical substance such as a specific gaseous substance and a smell component, and also applies to the case where a substrate itself without change in the mass is a catching substance, on which a specific substance is deposited or added. On the contrary, when a reaction in which a substance to be sensed caught by a catching substance or the like is released occurs, the mass of the catching substance or the like slightly decreases.

As an example of a method for sensing change in such a small mass, U.S. Pat. No. 4,789,804 discloses, as shown in FIG. 28, a mass sensor 80 comprising a quartz oscillator 81 and electrodes 82, 83 facing the quartz oscillator. When any substance adheres externally on these electrodes 82, 83, the mass sensor 80 senses change in their mass using change in the resonant frequency of the thickness slip oscillation (shear mode oscillation) of the quartz oscillator 81 in the direction of the surface of the electrodes.

However, such a mass sensor 80 has a problem in that since the part on which an external substance adheres and the part for detecting resonant frequency are in the same location, for example, the resonant frequency is unstable when the piezoelectric properties of the mass sensor 80 itself vary due to the temperature of the specimen or change in temperature. Also, if the specimen is a conductive solution, and when the mass sensor 80 is immersed unprotected in the specimen, short-circuit between electrodes may occur. Therefore, the mass sensor 80 must be subjected to insulation such as resin coating.

In order to solve problems in such a mass sensor 80, the present inventors have disclosed in Japanese Patent Application No. 9-361368 various mass sensors for measuring change in resonant frequencies before and after the mass has been changed when a diaphragm is allowed to oscillate by directly or indirectly changing the mass of the diaphragm. An example is shown in FIG. 27. A mass sensor 30 has a construction in which a resonating portion, composed by joining a connecting plate 33 to a diaphragm 31, and joining a sensing plate 32 having a piezoelectric element 35 arranged on the surface to the connecting plate 33, is joined to the side of a sensor substrate 34 having rectangular sides. In this mass sensor 30, change in the mass thereof can be known easily in a short time by measuring change in the resonant frequencies of the resonating portion mainly due to change in the mass of the diaphragm 31.

However, such a mass sensor 30 has a problem of difference in sensitivity depending on whether the location where the mass of the diaphragm 31 changed is, for example, the central portion or the end portion of the diaphragm 31, even the same amount of change, and improvement for minimizing the difference in sensitivity is demanded. Also, the sensitivity can be improved by making the diaphragm 31 oscillate more easily. In addition, if improvement of the sensitivity is pursued and moreover, the spread of the diaphragm 31 can be pursued, by making the diaphragm 31 oscillate more easily, measurement of mass on a more micro level will become possible.

SUMMARY OF THE INVENTION

This invention aims to solve the above problems of micro-mass sensors, and according to the present invention, there are provided first to sixth mass sensors structurally classified described below.

That is, according to the present invention, provided is a mass sensor as a first mass sensor, comprising:

a connecting plate having one or more slit(s) and/or opening portion(s) to be formed therein and/or having a thin-walled portion and a thick-walled portion to be formed therein;

a diaphragm joined with the connecting plate at respective side surfaces thereof;

a piezoelectric element;

a sensing plate with the piezoelectric element being provided at least at one part on at least one surface of the sensing plate, which has its side surface joined with the counterpart of the connecting plate in the direction perpendicular to the joining direction of the diaphragm and the connecting plate; and a sensor substrate with which at least a part of side surfaces of the connecting plate as well as the sensing plate are joined, wherein the diaphragm, the connecting plate, the sensing plate, and the piezoelectric element form a resonating portion.

In addition, according to the present invention, provided is a mass sensor as a second mass sensor, comprising:

a connecting plate having one or more slit(s) and/or opening portion(s) to be formed therein and/or having a thin-walled portion and a thick-walled portion to be formed therein;

a diaphragm joined with the connecting plate at respective side surfaces thereof;

a piezoelectric element;

two sensing plates with the piezoelectric element being provided at least at one part on at least one surface of at least one of the sensing plates, which has its side surface joined with the counterpart of the connecting plate, and so as to sandwich the connecting plate, in the direction perpendicular to the joining direction of the diaphragm and the connecting plate; and a sensor substrate with a part of which at least a part of side surfaces of the connecting plate as well as the sensing plate are joined, wherein the diaphragm, the connecting plate, the sensing plate, and the piezoelectric element form a resonating portion.

And in this second mass sensor, in the case where the piezoelectric element has been provided only on one sensing plate, it is preferable that at least one slit in formed in the other sensing plate in which no piezoelectric elements are provided in the direction perpendicular to the joining direction of the sensing plate and the connecting plate. Also, from the point of view of improvement on measuring sensitivities, in case of arranging two piezoelectric elements respectively to be provided on the surfaces of the two sensing plates facing the same direction, it is preferable to make the direction of polarization of the piezoelectric film of each piezoelectric element opposite to each other.

Moreover, according to the present invention, provided is a mass sensor as a third mass sensor, comprising:

two connecting plates having one or more slit(s) and/or opening portion(s) to be formed therein and/or having a thin-walled portion and a thick-walled portion to be formed therein;

a sensor substrate;

a diaphragm joined with the connecting plates at respective side surfaces thereof, and being sandwiched, which assembly is bridged across a gap between the side surfaces of the recessed portion provided in the sensor substrate;

a piezoelectric element; and a sensing plate with the piezoelectric element being provided at least at one part on at least one surface of the sensing plate, which is bridged across the gap between its lower side surface of the recessed portion and the side surface of the connecting plate in the direction perpendicular to the joining direction of the connecting plate and the diaphragm, wherein the diaphragm, the connecting plate, the sensing plate, and the piezoelectric element form a resonating portion.

Here, a recessed portion means a portion consisting of side surfaces facing to each other and a bottom surface connecting these side surfaces. In the present invention, the bottom surface is not necessarily a plane, but may be changed to various shapes, such as providing a cavity or providing a protrusion, unless the measurement of the oscillation or resonant frequencies of the diaphragm is affected.

Next, according to the present invention, provided is a mass sensor as a fourth mass sensor, comprising:

two connecting plates having one or more slit(s) and/or opening portion(s) to be formed therein and/or having a thin-walled portion and a thick-walled portion to be formed therein;

a sensor substrate;

a diaphragm joined with the connecting plates at respective side surfaces thereof, and being sandwiched, which assembly is bridged across a gap between the bottom side surfaces of the recessed portion provided in the sensor substrate so as to face each other;

a piezoelectric element; and four sensing plates with a piezoelectric element being provided at at least one part on at least one surface of two of said sensing plates which face each other with one of said connecting plate between, which is bridged across the gap between its side surface of the recessed portion and the side surface of the connecting plate in the direction perpendicular to the joining direction of said connecting plate and said diaphragm, and a piezoelectric element positioned at least one part on at least one surface of at least one of said sensing plates facing to said connecting plate, wherein said diaphragm, said connecting plate, said sensing plate, and said piezoelectric element form a resonating portion.

And in this fourth mass sensor, in the case where there exists any sensing plate to which the piezoelectric element is not provided, it is preferable that at least one slit is formed in the sensing plate in the direction perpendicular to the joining direction of the sensing plate and the connecting plate. On the other hand, in the case where two piezoelectric elements respectively are provided on the surfaces of the two sensing plates facing each other via the connecting plate, it is preferable to make the direction of polarization of the piezoelectric film of each piezoelectric element opposite to each other.

In addition, according to the present invention, provided is a mass sensor as a fifth mass sensor, comprising:

a first connecting plate and a second connecting plate having one or more slit(s) and/or opening portion(s) to be formed therein and/or having a thin-walled portion and a thick-walled portion to be formed therein;

a first diaphragm joined with said first connecting plate at respective side surfaces thereof, and a second diaphragm joined with said second connecting plate at respective side surfaces thereof, between which connecting plates a first sensing plate to which a piezoelectric element is provided at least on a part of at least one surface is bridged; and a senser substrate joined with the first connecting plate and the second connecting plate on the side surfaces each other so that the sensor substrate is positioned on the side opposite to the first diaphragm and the second diaphragm, wherein said diaphragm, said connecting plate, said sensing plate, and said piezoelectric element form a resonating portion.

In this fifth mass sensor, it is also preferable that respective side surfaces are joined so that the first connecting plate is sandwiched by the second sensing plate and the first sensing plate, and/or respective side surfaces are joined so that the second connecting plate is sandwiched by the third sensing plate and the first sensing plate, and the second sensing plate and the third sensing plate are joined so that the both of sensing plate is joined with the sensor substrate in the joining direction at least with the connecting plate. That is, the portions which are completed by joining respective sensing plates and respective connecting plates are fitted with the recessed portion provided in the sensor substrate, is preferable. It is preferable that the piezoelectric element is provided on at least one part of at least one surface of a second sensing plate and/or third sensing plate, or one or more slits are formed in the direction perpendicularly to the joining direction of a first sensing plate and a first connecting plate in a second sensing plate and/or a third sensing plate. In addition in the case where piezoelectric elements are provided on the second sensing plate and the third sensing plate, it is preferable to make the direction of polarization of the piezoelectric film of these piezoelectric elements and that of the piezoelectric film of the piezoelectric element provided on the first sensing plate opposite to each other.

Next, according to the present invention, provided is a mass sensor as a sixth mass sensor, comprising:

a first connecting plate and a second connecting plate having one or more slit(s) and/or opening portion(s) to be formed therein and/or having a thin-walled portion and a thick-walled portion to be formed therein;

a sensor substrate;

a piezoelectric element;

a sensing plate; and a first diaphragm joined with the first connecting plate at respective side surfaces thereof, and a second diaphragm joined with the second connecting plate at respective side surfaces thereof, between which connecting plates a first sensing plate is bridged across the gap, wherein the second sensing plate and the first sensing plate are joined with the first connecting plate so as to sandwich the first connecting plate at their side surfaces, and side surfaces of the third sensing plate, the first sensing plate, and the second connecting plate are joined to each other so that the second connecting plate is sandwiched by the third sensing plate and the first sensing plate, and the piezoelectric element is provided at least on a part of at least one surface of the second sensing plate and the third sensing plate respectively, and bottom side surfaces of the recessed portion provided in the sensor substrate are joined with the side surfaces of the first connecting plate and the second connecting plate, that the side surfaces are opposed to the joint side surfaces of the first diaphragm and the first connecting plate, and the second diaphragm and the second connecting plate, and the second sensing plate and the third sensing plate join with at least the side surface of the recessed portion.

And in this sixth mass sensor, it is also preferable that at least one slit is formed in the first sensing plate in the direction perpendicular to the bridging direction of the first sensing plate.

Now, in all of the first through sixth mass sensors of the present invention described above, the connecting plate is preferably formed by joining one thin plate and another plate- or post-like spring plate with one or more slit(s) and/or opening portion(s) together, and it is preferable to form a diaphragm, a connecting plate, a sensing plate, and a sensor substrate integrally. And the connecting plate itself is also preferably formed integrally.

In addition, in order to obtain such an integral structure, a method is used in which a thin plate forming a connecting plate, a diaphragm, and a sensing plate are integrally formed from a vibrating plate, and another plate- or post-like spring plate forming a connecting plate, are integrally formed from an intermediate plate, and the connecting plate is integrally formed by laminating the intermediate plate and the vibrating plate, and when the sensor substrate is formed by laminating the vibrating plate, the intermediate plate, and the base plate, the mass sensor of the present invention can be easily obtained in an integral structure.

Moreover, the thickness of the thin-walled portion of the connecting plate is preferably made thicker than the thickness of the diaphragm and/or sensing plate, and, in particular, when the thickness of the thin-walled portion of the connecting plate is made thicker than the thickness to be attained by adding the thickness of the sensing plate and of the piezoelectric element, the sensitivity can be planned to be improved, which is more preferable. Incidentally, it is also preferable to form one or more recessed portion(s) or through hole(s) in any optional shape on the sensor substrate, and to form a resonating portion on each of the inner circumferential surfaces of the recessed portion(s) or through-hole(s).

All the mass sensors of the present invention can be used suitably for the measurement of change in a micro mass. As an aspect of the use, there is a method in which a catching substance reacting with and catching a substance to be sensed is applied on a diaphragm, the resonant frequencies of the resonating portion in this state where the substance to be sensed has not been caught by the catching substance, and in the state after the substance to be sensed has been caught by the catching substance, and the mass of the substance to be sensed having been caught is measured from change in the measured resonant frequencies. In the method for using such a mass sensor, when the mass sensor has a plurality of diaphragms, the catching substance is not applied to at least one diaphragm, which can be used for referencing or the like. Also, by applying different types of catching substances to each of at least a plurality of diaphragms, different types of substances to be sensed can be sensed simultaneously.

In the mass sensor of the present invention, without depending on the above-described aspect, it is preferable that the resonating portions are provided at least at two or more places on the sensor substrate so as to increase the dynamic range by integrating signals derived from the respective resonating portions. Also, it is preferable to arrange two piezoelectric elements respectively to be provided on the surfaces of the two sensing plates facing the same direction, and to make the direction of polarization of the piezoelectric film of each piezoelectric element opposite to each other. Moreover, it is possible to divide at least one of piezoelectric elements into two, and use one for driving and the other for sensing, which will contribute to the improvement of measuring sensitivity. Moreover, it is possible to provide two piezoelectric elements at one resonating portion, and to use one piezoelectric element for driving and the other piezoelectric element for sensing, from which a similar effect is attainable. In addition, it is preferable to provide a piezoelectric element for sensing on a surface of the connecting plate.

Although the mass sensor of the present invention can be used in any environments, when it is immersed in a conductive solution on using, it is preferable to provide a position sensor consisting of a pair of electrodes on the middle position between the diaphragm and the piezoelectric element on the sensor substrate, so that the diaphragm is immersed in the solution but the piezoelectric element is not, so as to cause change in the mass mainly of the diaphragm, and to prevent the short-circuiting of the piezoelectric element. In addition, if the piezoelectric element, the electrodes of the piezoelectric element and electrode leads connected to the electrode are coated with a resin or glass insulation coating layer, it is convenient for the mass sensor to be used in a humid environment or in a liquid. At this time, fluorocarbon resin or silicone resin is preferably used as resin. Furthermore, it is preferable that a shield layer consisting of a conductive member is formed on at least a part of the surface of this insulation layer, so as to reduce noise and to improve measurement sensitivity.

In the mass sensor of the present invention, the sensor substrate, the diaphragm, the connecting plates, and the sensing plate are preferably fabricated using fully stabilized zirconia or partially stabilized zirconia. As the piezoelectric film of the piezoelectric element, a material consisting mainly of lead zirconate, lead titanate, or lead magnesium niobate is preferably used. The dimensional adjustment of at least any of the diaphragm, the connecting plates, and the sensing plate is preferably performed by trimming using laser processing or machining. Trimming using laser processing or machining is also preferably used for the dimensional adjustment of the electrodes of the piezoelectric element, thereby the available electrode area of the piezoelectric element can easily be adjusted.

Now, according to the present invention, provided is a mass sensing method comprising:

providing a mass sensor comprising:
a connecting plate having one or more slit(s) and/or opening portion(s) and/or having a thin-walled portion and a thick-walled portion formed in the connecting plate, a diaphragm joined with the connecting plate at respective side surfaces thereof, at least one sensing plate joined with the connecting plate at respective side surfaces thereof, and at least one piezoelectric element being provided so that at least one portion of the side surfaces of said connecting plate and said sensing plate are joined with a portion of side surfaces of the sensor substrate, and measuring the resonant frequency with said piezoelectric element at least based either on v mode swing oscillation or vz mode swing oscillation, v mode swing oscillation involving straight-line like reciprocal oscillation of said diaphragm with a perpendicular axis passing through perpendicularly at the center of the joint surfaces of said connecting plate and said sensor substrate being the center, in the direction in parallel with the surface of the said diaphragm and perpendicular with said perpendicular axis, and vz mode swing oscillation involving swing-like reciprocal oscillation of said diaphragm with said perpendicular axis being center, in the direction in parallel with the surface of said diaphragm and perpendicular with said perpendicular axis, accompanied by movement in the direction perpendicular with the surface of said diaphragm.

BRIEF DESCRIPTION OF THE DRAWINGS

FIGS. 12(a) and (b) are diagrams showing still another embodiment of a mass sensor of the present invention; (a) is a plan view; (b) is a sectional view.

FIGS. 13(a) and (b) are diagrams showing still another embodiment of a mass sensor of the present invention; (a) is a plan view; (b) is a sectional view.

FIG. 26 is a diagram illustrating an example of methods for the fabrication of a piezoelectric element used in a mass sensor of the present invention.

FIG. 27 is a sectional view showing a basic structure of a micro-mass sensor.

FIG. 28 is a sectional view illustrating the basic structure of a conventional micro-mass sensor.

FIG. 29 is a perspective view showing a structure of a conventional quartz friction vacuum gauge.

FIGS. 30(a) and (b) are diagrams showing still another embodiment of a mass sensor of the present invention; (a) is a plan view; (b) is a sectional view.

FIGS. 31(a) and (b) are diagrams showing still another embodiment of a mass sensor of the present invention; (a) is a plan view; (b) is a sectional view.

FIGS. 32(a) and (b) are diagrams showing still another embodiment of a mass sensor of the present invention; (a) is a plan view; (b) is a sectional view.

FIGS. 33(a) and (b) are diagrams showing still another embodiment of a mass sensor of the present invention; (a) is a plan view; (b) is a sectional view.

FIGS. 34(a), (b) and (c) are diagrams showing still another embodiment of a mass sensor of the present invention; (a) is a plan view; (b) is a sectional view; (c) is a sectional view.

DETAILED DESCRIPTION OF PREFERRED EMBODIMENT

Figure 1:
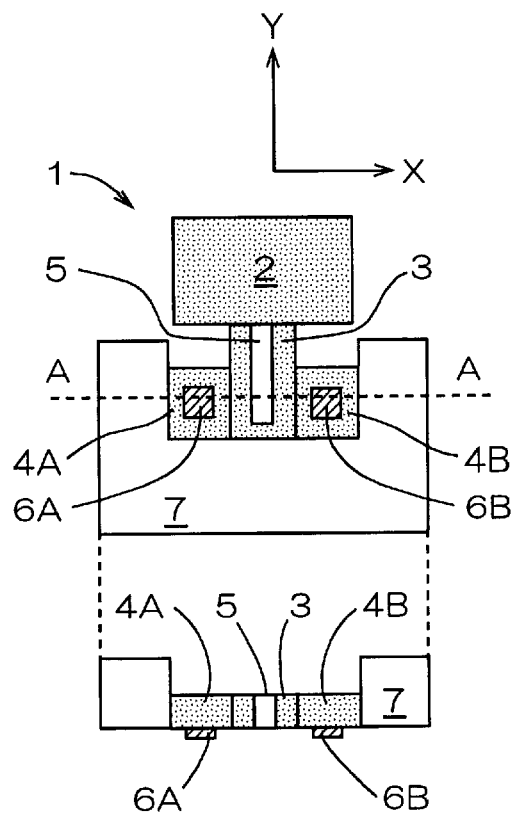
FIGS. 1(a)(b) are diagrams showing an embodiment of a mass sensor of the present invention; (a) is a plan view; (b) is a sectional view.
Figure 1:
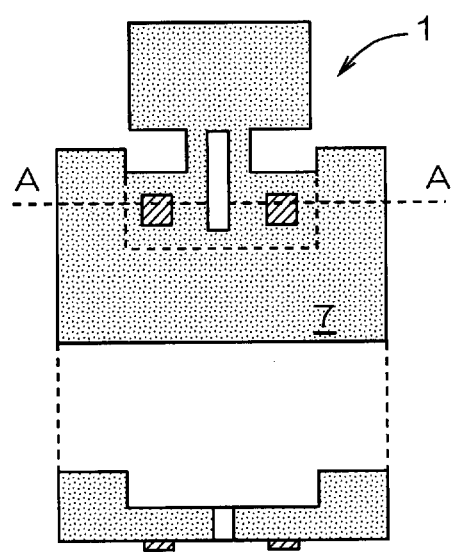

Since the mass sensor of the present invention has a structure in which difference in sensitivity depending on the location of change in the mass of the diaphragm, and the diaphragm easily oscillates at larger amplitudes, change in the micro mass can be known surely in a short time with a great accuracy from the specific value of change in the resonant frequencies of the resonating portion. Therefore, the mass sensor can be used favorably for sensing, for example, microorganisms or chemical substances, etc. in a specimen. The embodiments of the present invention will be described below with reference to drawings, focussing on a mass sensor comprising a catching substance reacting with and catching only a specific substance to be sensed, applied to a diaphragm, and on the use of that mass sensor.

As described above and as will be described below, the mass sensor of the present invention has many applications other than the measurement of change in the mass. Therefore, the present invention is not limited to the following description.

FIG. 1(a) is a plan view as well as a sectional view viewed from the A-to-A dashed line (referring to a sectional view on the surface which is vertically placed on the drawn surface via the A-to-A dashed line, hereinafter to be applied likewise as well) showing an embodiment of a mass sensor of the present invention. In the mass sensor 1, a diaphragm 2 and a connecting plate 3 in which one slit 5 is formed are joined to each other on their respective side surfaces, and two sensing plates 4A and 4B are joined on their side surfaces with the connecting plate 3 so as to sandwich the connecting plate 3 in the direction (in the X-axis direction) which crosses at a right angle with the direction of joining with the diaphragm 2 and the connecting plate 3 (in the Y-axis direction). Piezoelectric elements 6A and 6B are respectively provided on surfaces of the sensing plates 4A and 4B at one side, and without the diaphragm 2 being made to join with the sensor substrate 7, the connecting plate 3 and at least one part of side surfaces of the sensing plate 4a and 4b are made to join with a part of side surfaces of the sensor substrate 7 (in this case to join in such a style to fit in the recessed portion provided in the sensor substrate 7). And the diaphragm 2, the connecting plate 3, the sensing plate 4A and 4B, and the piezoelectric elements 6A and 6B form the resonating portion.

Here, the slit 5 is formed in the longitudinal center part of the connecting plate 3, but such a position is not mandatory. However, it is preferable that the slit 5 is formed symmetrically about the longitudinal center line of the connecting plate 3. In addition, at least a part of side surfaces of the connecting plate 3 and the sensing plates 4A and 4B to be joined with the sensor substrate 7 is referred to, basically, as for the connecting plate 3, a side surface opposing the side surface on the connecting plate 3 joined with the diaphragm 2, and as for the sensing plates 4A and 4B, a side surface opposing the side surface on the connecting plate 3 joined with the sensing plates 4A and 4B. Accordingly, the sensing plates 4A and 4B do not necessarily need to be joined with the recessed bottom surface of the sensor substrate 7, but it is preferable that they are joined with the side surface of the sensor substrate 7. Such a mode of joining the connecting plate 3 and the sensing plates 4A and 4B with the sensor substrate 7 is applicable to the mass sensor of the present invention mentioned below.

Incidentally, a diaphragm mainly means the place to cause or to be subject to change in mass, and is an element that oscillates or vibrates in various modes as described later; a connecting plate means an element to connect the diaphragm, sensor substrate, and sensing plate; and a sensing plate means an element that is deformed by the movement of the diaphragm, and transmits the strain to the sensing element, such as a piezoelectric element, installed on the surface, or on the contrary, transmits strain or oscillation or vibration generated by a driving element, such as a piezoelectric element, to the diaphragm. The sensor substrate means an element to support the resonating portion, carry various electrode terminals for connecting to measuring instruments, and is used for handling in actual uses.

In the mass sensor 1, the diaphragm 2, the connecting plate 3, and the sensing plate 4A and 4B are not necessarily required to have the same thickness, but preferably have the same thickness so as to form the even surface. As a result, it is preferred that the diaphragm 2, the connecting plate 3, and the sensing plate 4A and 4B are integrally formed from suitably a plate (hereafter referred to as "vibrating plate"), which is advantageous on the point that fabrication will become easier for the purpose of manufacturing. Therefore, although boundaries are shown by solid lines at joining portions between the diaphragm 2, the connecting plate 3, and the sensing plate 4A and 4B in FIG. 1(a), practically and preferably, the diaphragm 2, the connecting plate 3, and the sensing plate 4A and 4B are of an integral structure without structural boundaries.

It is preferable that the connecting plate 3 and the sensing plate 4A and 4B are also directly and integrally formed with a sensor substrate 7. In order to realize such a structure, it is preferable to form the sensor substrate 7 integrally with the vibrating plate and the base plate as described in detail in the fabrication of the mass sensor of the present invention described below. Here, the base plate is preferably formed thicker than the vibrating plate for maintaining the mechanical strength of the mass sensor 1 itself. The base plate means a plate used for forming the main part of the sensor substrate 7.

The thickness of the diaphragm 2 is preferably 3 to 20 $\mu$m, and more suitably, 7 to 15 $\mu$m, which is similarly applicable to the connecting plate 3 and the sensing plate 4A and 4B as well. The thickness of the base plate at this time is adequately determined considering the ease of operating.

Such diaphragm 2, connecting plate 3, sensing plate 4A and 4B, and the sensor substrate 7 are preferably formed from a ceramic material, and such ceramic materials include, for example, stabilized zirconia, partially stabilized zircania, alumina, magnesia, and silicon nitride. Among these, stabilized/partially-stabilized zirconia is most preferably adopted because of its high mechanical strength even in a small thickness, high toughness, and low reactivity with the piezoelectric film and electrode materials. When stabilized/partially-stabilized zirconia is used as a material for the sensor substrate 7 or the like, it is preferable to prepare a vibrating plate so that at least an additive such as alumina or titania is contained in the sensing plate 4A and 4B. Incidentally, these materials are to be used in common through all the mass sensors of the present invention.

Incidentally, the vibrating plate and the base plate forming the sensor substrate 7 are not necessarily required to be formed from the same material, but the combination of the above-described various ceramic materials may be used. However, it is preferable to construct the parts integrally using the same type of materials from the point of view of securing the reliability of joints and the simplification of the manufacturing process.

Figure 2:
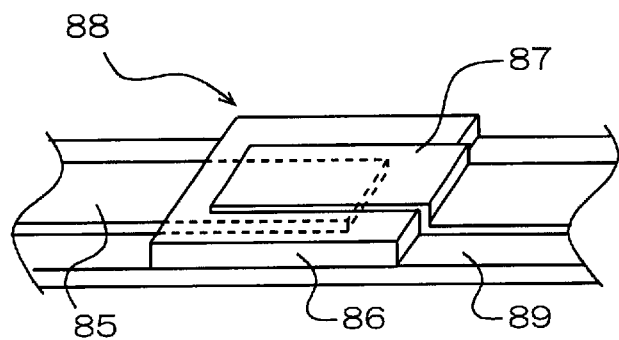
FIG. 2 is a perspective view showing an embodiment of a piezoelectric element installed in a mass sensor of the present invention.
Figure 3:
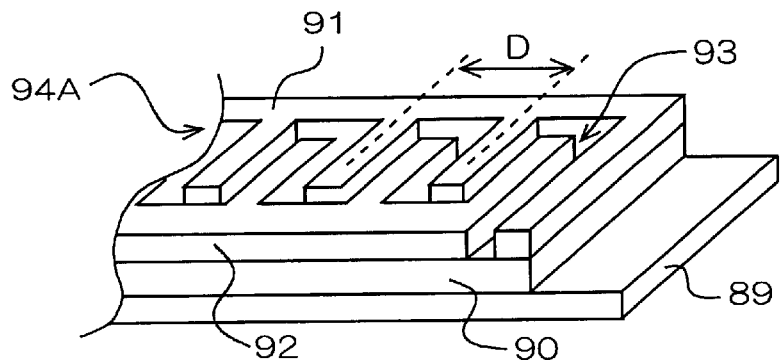
FIG. 3 is a perspective view showing an embodiment of another piezoelectric element installed in a mass sensor of the present invention.
Figure 4:
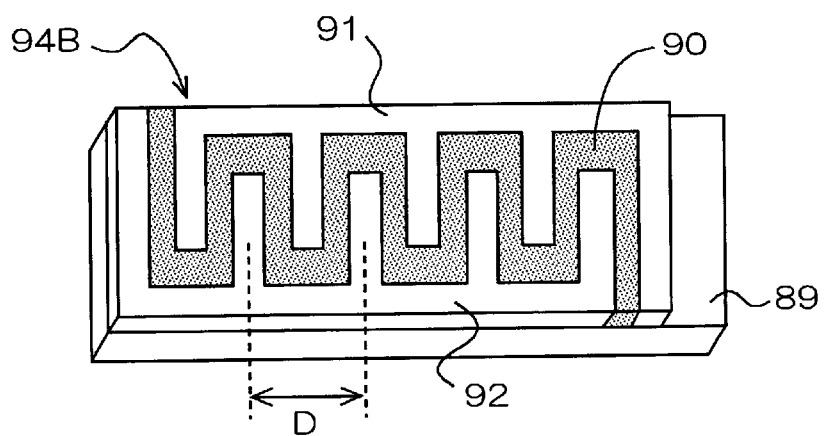
FIG. 4 is a perspective view showing an embodiment of still another piezoelectric element installed in a mass sensor of the present invention.

Now, the aspects of the piezoelectric element 6A and 6B include the piezoelectric element 88 having a first electrode 85, a piezoelectric film 86, and a second electrode 87 laminated on the sensing plate 89 as FIG. 2 shows, or a piezoelectric element 94A having a comb structure in which a piezoelectric film 90 is placed on a sensing plate 89 and a first electrode 91 and a second electrode 92 form gaps 93 of a constant width on the top of the piezoelectric film 90 as FIG. 3 shows. Incidentally, the first electrode 91 and the second electrode 92 in FIG. 3 may be formed in the surface between the sensing plate 89 and the piezoelectric film 90. Furthermore, as shown in FIG. 4, a piezoelectric element 94B in which a piezoelectric film 90 is embedded between the comb-shaped first and second electrodes 91, 92 may also be formed. Here, when comb-shaped electrodes as shown in FIGS. 3 and 4 are used, the measuring sensitivity can be raised by reducing the pitch D. Incidentally, in the mass sensor 1, the piezoelectric elements 6A and 6B are provided with electrode leads so as to be conductive to respective electrodes, but these electrode leads are omitted from the drawing in FIG. 1(a).

Although a piezoelectric film consisting of piezoelectric ceramics is suitably used in the piezoelectric elements 6A and 6B, electrostrictive ceramics or ferroelectric ceramics may also be used. These materials may be those requiring or not requiring polarization treatment.

Piezoelectric ceramics include, for example, lead zirconate, lead titanate, lead magnesium niobate, lead magnesium tantalate, lead nickel niobate, lead zinc niobate, lead manganese niobate, lead antimony stannate, lead manganese tungstate, lead cobalt niobate, and barium titanate, or composite ceramics containing a combination of any of the above ceramics, but in the present invention, a material mainly containing the components consisting of lead zirconate, lead titanate, and lead magnesium niobate as the main component is preferably used. This is based on the fact that such a material not only has high electromechanical coupling factor and piezoelectric constant, but also has small reactivity with the sensor substrate member upon sintering the piezoelectric film, and can be formed in a predetermined composition stably.

Furthermore, ceramics containing oxides of lanthanum, calcium, strontium, molybdenum, tungsten, barium, niobium, zinc, nickel, manganese, cerium, cadmium, chromium, cobalt, antimony, iron, yttrium, tantalum, lithium, bismuth, tin, or the like alone, or combinations of some of these oxides, or ceramics in which other compounds were appropriately added may be used. For example, a ceramic material containing lead zirconate, lead titanate, and lead magnesium niobate as main components, which contain lanthanum or strontium are also preferable.

On the other hand, the first electrode and the second electrode in the piezoelectric element 6A and 6B are preferably formed from a metal that is solid at room temperature and conductive, and, for example, a metal such as aluminum, titanium, chromium, iron, cobalt, nickel, copper, zinc, niobium, molybdenum, ruthenium, palladium, rhodium, silver, tin, tantalum, tungsten, iridium, platinum, gold, lead, or the like alone, or an alloy of some of these elements can be used, and furthermore, a cermet material in which the same material that was used in the piezoelectric film or the sensing plate is dispersed in these materials may be used.

Incidentally, the actual selection of the material for the first electrode and the second electrode is determined depending on the method for forming the piezoelectric film. For example, when the above-described piezoelectric element 88 is formed, at first the first electrode 85 is formed on the sensing plates 4A and 4B, then the piezoelectric film 86 is formed on the first electrode 85 by sintering, the first electrode 85 must be made of a high melting point metal, such as platinum, which is not affected by the temperature for sintering the piezoelectric film 86. Whereas, since the second electrode 87 formed on the piezoelectric film 86 after forming the piezoelectric film 86 can be formed at a low temperature, a low melting point metal, such as aluminum, can be used.

Although the piezoelectric element 88 can be formed integrally by co-firing with electrodes, in this case, both the first electrode 85 and the second electrode 87 must be made of a metal having a high melting point which resists the temperature for sintering the piezoelectric film 86. On the other hand, when the first and second electrodes 91, 92 are formed on the piezoelectric film 90, as shown in FIG. 3, both electrodes can be made of the same metal having a low melting point. Thus, the materials for the first electrode and the second electrode can be selected suitably depending on the sintering temperature of the piezoelectric film 86, and the structure of the piezoelectric element.

Since a problem arises when the area of the piezoelectric film is expanded, in that although sensitivity increases because of an increase in the output charge, the size of the sensor increases, and thus the area of the piezoelectric film should be preferably designed to an adequate size in an appropriate fashion. Also, since a problem arises when the thickness of the piezoelectric film is decreased, in that although sensitivity increases, the rigidity of the piezoelectric film is lowered. Thus, the total thickness of the sensing plates 4A and 4B and the piezoelectric film is suitably 15 to 50 μm. The structure of the piezoelectric element and the materials to be used are common to all the mass sensors of the present invention.

In the mass sensor 1, the connecting plate 3 is provided with the slit 5, with which the mass of the connecting plate 3 is reduced, and the mass ratio between the diaphragm 2 and the connecting plate 3 (i.e. the mass of the diaphragm divided by the mass of the connecting plate) will be made larger to pursue improvement of the sensitivity, and moreover, making the diaphragm 2 oscillate or vibrate easily at the ν mode mentioned below reduces dispersion in sensitivity inside the diaphragm 2.

It is preferable that this mass ratio (mass of the diaphragm 2/mass of the connecting plate 3) is set at not less than 0.1 and is set in an appropriate fashion at an adequate ratio within this range of mass ratio, considering the thickness and area of the diaphragm 2.

As the oscillation modes of the diaphragm 2, ν mode, in which the diaphragm 2 oscillates to the X-axis, or νz mode, in which the diaphragm 2 oscillates to the X-axis accompanied by the component of the Z-axis direction, being vertical to the paper (the direction perpendicular to both the X axis and the Y axis), are preferably used, and the usage of these oscillation modes can make the difference in sensitivity due to mass change or difference in position in the diaphragm 2 small. Also, since these oscillation modes are rigid-body modes utilizing the side of the diaphragm 2, and since the diaphragm 2 is thin, they are hardly affected by the external environment such as density and viscosity, and therefore, resist change in temperature, have the highest sensitivity, and excel in resistance to the environment. Due to such characteristics, the mass sensor 1 can be used even if the diaphragm 2 or the entire mass sensor 1 is immersed in a liquid.

Figure 5:
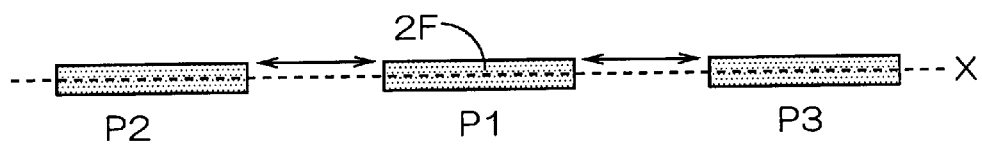
FIG. 5 is a diagram illustrating the v mode swing oscillation of a diaphragm in a mass sensor of the present invention.

Here, the ν mode and νz mode will be described below in detail. FIG. 5 is a diagram illustrating the ν mode, and showing the movement of the diaphragm 2 viewed from the Y-axis direction on the X-axis in FIG. 1(*a*) on the mass sensor 1 in the FIG. 1(*a*). Here, the top side surface 2F of the diaphragm 2 is located in P1 under the state without oscillation, but with the ν mode the diaphragm 2 oscillates to the direction of X-axis in the inner-surface direction of the diaphragm 2, and scarcely contains the component of oscillation to the direction of Y-axis. Accordingly, the movement of the top side surface 2F of the diaphragm 2 can be expressed as the oscillation traveling reciprocally between the position P2 and the position P3 on the X-axis. In the present invention, this oscillation movement is defined as the ν mode.

Figure 6:
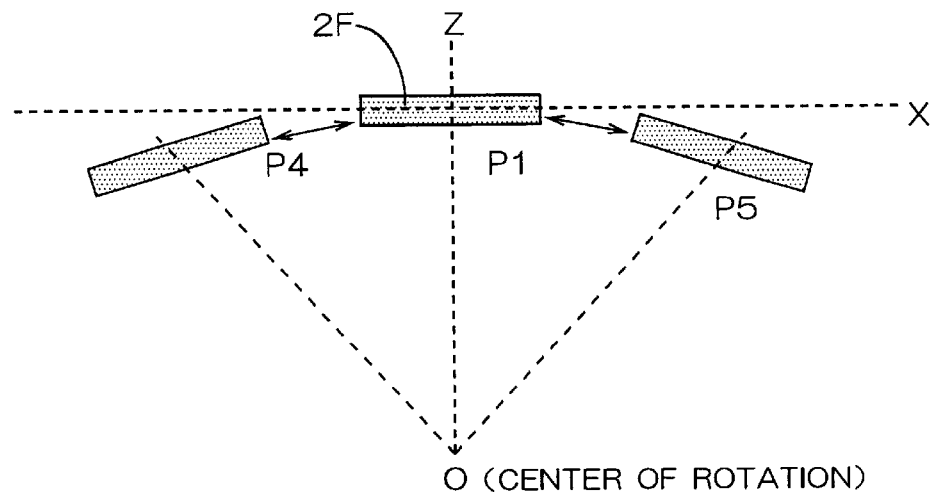
FIG. 6 is a diagram illustrating the vz mode swing oscillation of a diaphragm in a mass sensor of the present invention.

Next, FIG. 6 is a diagram illustrating the νz mode, and, similar to FIG. 5, showing the movement of the diaphragm 2 viewed from the Y-axis direction on the X-axis in FIG. 1(*a*). Here, too, the top side surface 2F of the diaphragm 2 is located in P1 under the state without oscillation. With the νz mode, the diaphragm 2 oscillates in parallel to the X-axis, but scarcely contains the component of oscillation to the direction of Y-axis, and oscillates accompanied by the component to the direction of Z-axis, and thus the movement of the top side surface 2F of the diaphragm 2 can be expressed as reciprocal oscillation between the position P4 and the position P5 on the arc track passing the position P1 having one point on the Z-axis as the center of rotation O. In the present invention, this oscillation movement is defined as the νz mode.

Incidentally, these various displacement modes are to mean that the respective displacement directions of the diaphragm 2 is dominant to the respectively aforementioned directions, and are not intended to completely exclude having the components other than those described directions. This remark can be repeated similarly in the cases where reference is made to a displacement mode when various embodiments are explained as follows.

In the mass sensor 1, other than the above-described ν mode, and νz mode, the flexural mode, in which the diaphragm 2 oscillates like a swing in the direction of the Z-axis, or the axis rotation mode in which the diaphragm 2 oscillates in a rotational fashion around the Y-axis (the basic axis), can also be used. But, with the flexural mode, surfaces of the diaphragm 2 are easily influenced by resistance from outside, and its result is big, which is a problem, and with the axial rotation mode, the difference in the mass displacement position of the diaphragm 2, for example at the central part and at the left or right end parts, gives rise to difference in the moment of inertia to easily give rise to sensing error, which is disadvantageous.

Now, in the mass sensor 1, when an AC voltage is applied to the piezoelectric film of one piezoelectric element, for example the piezoelectric element 6A, expanding and contracting oscillation occurs in the piezoelectric film due to the piezoelectric constant $d_{31}$ or $d_{33}$ and bending movement occurs in the sensing plate 4A. This movement is transmitted to the diaphragm 2, the diaphragm 2 oscillates at the same frequency as the frequency of the AC voltage applied to the piezoelectric film, and when the frequency of the AC voltage is a certain frequency, the resonance phenomenon of the above-described ν mode or the like occurs. By measuring change in the resonant frequency by the piezoelectric element 6A itself, the presence of change in the mass of the diaphragm 2 can be checked. Incidentally, the resonant frequency can be measured by the piezoelectric element 6A and the piezoelectric element 6B when both piezoelectric elements provide excitation to the diaphragm 2.

On the other hand, when the diaphragm 2 is oscillated by the external excitation force or the like, bending/distortion oscillation occurs in the sensing plates 4A and 4B, thereby expanding and contracting oscillation occurs in the plate-like piezoelectric film 86 when the piezoelectric elements 6A and 6B have a structure like the piezoelectric element 88, and a voltage is generated on the basis of the electromechanical coupling factor $k_{31}$ (Piezoelectric constant $d_{31}$) of the piezoelectric film 86. Incidentally, when the piezoelectric elements 6A and 6B are the piezoelectric element 94A or 94B having a comb-shaped electrode structure, a constant voltage is generated on the basis of $K_{33}$ ($d_{33}$). By sensing the P—P value of such a voltage value and sensing the frequency with which the P—P value reach the maximum, the resonant frequency respectively in the v mode and the vz mode can be sensed, and change in the mass can be known. This resonant frequency is preferably measured by using both the piezoelectric elements 6A and 6B, but can be measured by using only one of them.

In addition, in the present invention, although it is preferable that the piezoelectric element is constituted by the element utilizing the transverse effect of the electric field induced strain represented by the above-described $d_{31}$ or $k_{31}$, or the longitudinal effect of the electric field induced strain represented by $d_{33}$ or $k_{33}$, it can also be constituted by the element utilizing the slipping effect of the electric field induced strain (shear mode) represented by $d_{15}$ or $k_{15}$ or the like.

Incidentally, for sensing under the aforementioned respective modes, not only sensing involving the resonant frequency of the first order but also sensing involving resonant frequencies of higher order such as the second order and the third order is preferable. For example, in the first order resonant frequency, when the resonant frequencies under oscillation modes other than v mode or vz mode but close to oscillation under v mode or vz mode is used at the stage of designing, sensing using modes with other higher order resonant frequencies can provide improved determination accuracy.

Now, as shown in the mass sensor 1, in the case where the piezoelectric elements 6A and 6B have been respectively provided on respective surfaces of the sensing plates 4A and 4B in the same direction, it is also preferable for the improvement of measuring sensitivity to make the direction of polarization of the piezoelectric film of the piezoelectric element 6A provided in one sensing plate 4A and the direction of polarization of the piezoelectric film of the piezoelectric element 6B provided in the other sensing plate 4B opposite to each other. In addition, measuring sensitivity can be improved by using one of the piezoelectric elements 6A for driving (exciting) the diaphragm 2 and the other 6B for sensing (receiving). Moreover, by performing the comparing operation of signals sensed by respective piezoelectric element 6A and 6B, the dynamic range can be expanded.

Incidentally, in the mass sensor of the present invention, at least one of the piezoelectric elements may do well if it is formed on the surface of any of the two sensing plates. Even in this case, improvement in sensitivity can be pursued, and for example, in the case where only the piezoelectric element 6A has been provided in the mass sensor 1, the piezoelectric element 6A can be divided into two piezoelectric elements in the Y-axis direction so as to form and provide two piezoelectric elements, one of which can be used for driving and the other of which can be used for sensing. Here, such a divided piezoelectric element 6A can be formed either by the method in which a piezoelectric element 6A is divided by laser processing or the like after providing the piezoelectric element 6A, or the method in which the previously divided piezoelectric element 6A is provided when the piezoelectric element 6A is provided.

In addition, in the case where two piezoelectric elements are provided in one mass sensor 1, one piezoelectric element is to be provided respectively at least one part of both surfaces of one sensing plate, namely at two parts, and resulting sensed signals are proceeded with comparing operation so that the noise can be decreased, the influence of other oscillation modes can be eliminated, and measuring sensitivity can be improved.

Moreover, the piezoelectric element may be provided on both surfaces of two sensing plates, in which case the number of piezoelectric elements to be provided will be four. Moreover, among these four piezoelectric elements, the optionally selected one may further be divided in the Y-axis direction as described before. In this case, roles such as signal operation, and driving/sensing, etc., will be separately assigned to respective piezoelectric elements to make highly accurate measurement possible, but will give rise to such a problem that the fabrication process (forming process of piezoelectric elements) will become complicated. That is, the number of piezoelectric elements to be provided may be determined, considering the order, accuracy, and fabrication costs, etc., on the mass to be sensed.

Incidentally, as concerns adjustment of sensitivity, other than the above-described method by adjusting the mass ratio between a diaphragm and a connecting plate as well as selection of how to use piezoelectric elements, a method by decreasing the thickness of the diaphragm and increasing the ratio of the mass of the substance to be sensed to the mass of the diaphragm (mass of the substance to be sensed/mass of the diaphragm) is also suitably used.

Next, the aspect of the use of the mass sensor 1 will be described. As an aspect of the use of the mass sensor 1, there is a case where a catching substance reacting with and catching a substance to be sensed is applied to the diaphragm 2. In this case, since the resonant frequency of the resonating portion in the state where the substance to be sensed has not been caught by the caching substance on the diaphragm 2 differs from the resonant frequency of the resonating portion after the substance to be sensed has been caught, depending on the mass of the substance to be sensed having been caught, the mass of the substance to be sensed having been caught by the catching substance can in turn be measured by measuring change in the resonant frequencies with the piezoelectric elements 6A and 6B. Substances to be sensed are exemplified by an antigen causing disease, and catching substances can be exemplified by an antibody for this antigen.

As concerns measurement methods, in this case, more specific measurement methods include a method in which a catching substance is applied to the diaphragm 2, the diaphragm 2 is immersed in a liquid containing a substance to be sensed, or exposed to a gaseous atmosphere such as a particular gas, the substance to be sensed is allowed to be caught by the catching substance to change the mass of the diaphragm 2, and change in the resonant frequencies of the resonating portion is measured by the piezoelectric elements 6A and 6B. The resonant frequencies can also be measured after drying the diaphragm 2 in the air after the diaphragm 2 to which the catching substance is applied is immersed, and the substance to be sensed is caught by the catching substance. Here, it is needless to say that the above-described various oscillation modes and various modes of piezoelectric elements can be used.

The mass sensor 1 can also be used for measuring decrease in the mass, when the mass of the diaphragm 2 decreased from the initial state. For example, when the applied catching substance is peeled off for some reason when an extremely small quantity of substance applied to the diaphragm 2 is corroded or dissolved in a particular solution, or when a particular chemical substance other than a catching substance is applied to the diaphragm 2, the sensor 1 can be suitably used for measuring change in the mass of these substances due to, evaporation, or dissolution or the like.

As described above, by applying the measurement principle in which the mass sensor 1 is placed in the environment to change the resonant frequencies of the resonating portion, the mass sensor 1 can be used for measuring various physical and chemical quantities. Although details will be described later for example, the mass sensor 1 can be used as a thickness gauge of vapor-deposited films or a dew indicator utilizing change in the mass of a substance deposited on the diaphragm, a vacuum gauge, a viscosity meter, or a temperature sensor utilizing the environment where the diaphragm is placed, such as vacuum, viscosity and temperature.

Figure 7:
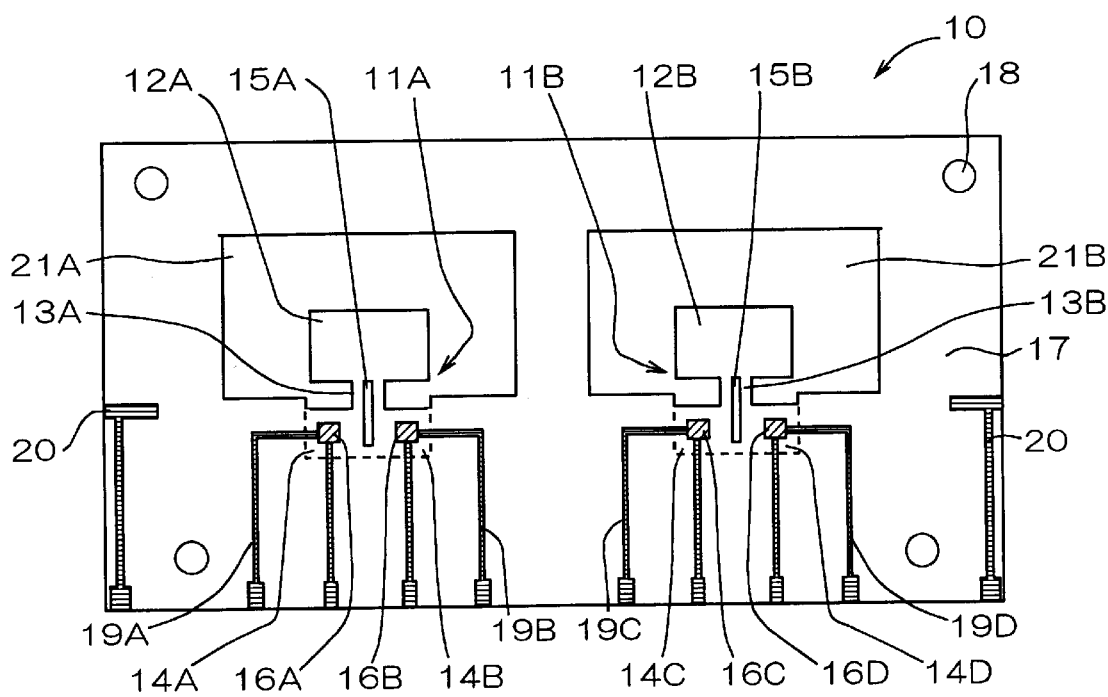
FIG. 7 is a plan view showing another embodiment of a mass sensor of the present invention.

Next, a plan view of a mass sensor 10, which is another embodiment using the above-described mass sensor 1, is shown in FIG. 7. In the mass sensor 10, two resonating portions (resonating portions 11A and 11B), having the same structure as the mass sensor 1, are shown. Since the detailed construction of these resonating portions 11A and 11B is the same as that of the mass sensor 1, it is not described here. Although the using method of the resonating portions 11A and 11B is similar to the using method of the mass sensor 1, by forming two or more resonating portions in a sensor as the mass sensor 10, the dynamic range can be expanded by integrating the signals from each resonating portion, and at least one resonating portion can be used for reference or for measuring other physical quantities.

A reference hole 18 formed in the sensor substrate 17 is provided as an alignment mark used in packaging and manufacturing processes of the mass sensor 10, and the sensor substrate 17 is preferably integrally formed by laminating a vibrating plate and a base plate as in the mass sensor 1. It is also preferable that diaphragms 12A and 12B, sensing plates 14A through 14D, and connecting plates 13A and 13B in the resonating portions 11A and 11B are integrally formed from the vibrating plate, and the slits 15A and 15B are formed in the connecting plates 13A and 13B. Electrode leads 19A through 19D are provided from piezoelectric elements 16A through 16D each having a pair of electrodes provided on the surfaces of the sensing plate 14A through 14D, to the bottom of the sensor substrate 17, and the ends of the electrode leads 19A through 19D are connected to terminals or the like on the measuring apparatus part such as a probe.

Furthermore, a position sensor 20 comprising a pair of electrodes is provided on the mass sensor 10. The position sensor 20 conducts electricity when the mass sensor is immersed in a conductive specimen such as an aqueous solution, and senses the position of the immersed mass sensor 10. That is, for a conductive specimen, when the portion of the position sensor 20 higher than the horizontally formed pattern is immersed in the specimen, and the portion of the mass sensor 10 lower than the position at which the position sensor 20 responds is not immersed in the specimen, the short-circuiting of the piezoelectric elements 16A through 16D and the electrode leads 19A through 19D can be prevented. It is needless to say that the position sensor 20 can also be formed on the sensor substrate in the above-described mass sensor 1. However, when the piezoelectric elements 16A through 16D and the electrode leads 19A through 19D are coated by an insulation resin or the like, since the short-circuiting of the piezoelectric elements 16A through 16D and the electrode leads 19A through 19D can be prevented even if the mass sensor 10 is immersed in a conductive specimen, the provision of the position sensor is not necessarily required. Also, when the mass sensor 1 is immersed in a liquid, and the depth of the mass sensor 1 is controlled, the depth of the mass sensor 1 can easily be controlled by the position sensor 20.

Now, in the mass sensor 10, resonating portions 11A and 11B are provided utilizing the circumferences of openings 21A and 21B provided in the sensor substrate 17. Thus, it is also preferable that the mass sensors of the present invention have a structure in which one or more openings are formed in the sensor substrate, and resonating portions are provided so that two sensing plates and two connecting plates are fitted in each opening.

On the other hand, the resonating portions may be provided on the peripheral portion of the sensor substrate. For example, an aspect is considered in which a concave portion is provided on the upper edge of the mass sensor 10 shown in FIG. 7, and the resonating portion is placed in this recessed part. In this case, however, since the thin-plate-shaped diaphragms 12A and 12B protrude from the peripheral portion of the sensor substrate 17, care should be taken not to damage the diaphragms 12A and 12B during handling the mass sensor 10. Therefore, when the protection of resonating portions 11A, 11B from external impacts is considered, it is preferable to adopt the structure having resonating portions 11A and 11B inside the sensor substrate 17 as FIG. 7 shows. Such a structure is also preferable for facilitating the manufacture of mass sensors as described below. Furthermore, it is feasible to decrease noise by increasing the distance between the diaphragms 12A and 12B and the upper sides of the openings 21A and 21B to reduce the influence of the reflected waves of sensor oscillation. For reducing noise, it is preferable to dispose the diaphragms 12A and 12B so as to protrude outside from the sensor substrate 17.

Incidentally, it is preferable to attempt the reduction of noise due to the reflected waves of sensor oscillation by considering the structure of the mass sensor itself, and otherwise, for example, when the mass sensor is used in a liquid considering the material and shape of the container of the liquid. For example, for the purpose of reducing reflection from the wall surface of the container, it is preferable to use a flexible resin or the like as the material for the container, or to coat the internal wall of the container with a flexible resin such as a rubber-like or gel-like silicone resin or a flexible epoxy resin. In this time, it is also preferable to select the material considering the frequency band of sound waves. Furthermore, as concerns the shape of the container, it is preferable to change the shape of the inner wall of the container depending on the oscillation mode of the diaphragm so that the reflected waves are not returned to the diaphragm.

Next, the method for using a mass sensor 10 of the present invention will be described when the mass sensor 10 is used as an immune sensor. One of two resonating portions 11A and 11B (11A) is used as a sensing resonating portion 11A and to the diaphragm 12A of the sensing resonating portion 11A is applied a catching substance which reacts with only a substance to be sensed, such as a pathogenic virus, and catches it. For example, the combination of an antigen as the substance to be sensed, and an antibody as the catching substance can be used as examples, and such combinations are exemplified by human serum albumin/anti-human serum albumin antibody and human immunoglobulin/anti-human immunoglobulin antibody. Whereas, the other resonating portion 11B is used as a reference resonating portion 11B, to the diaphragm 12B of which no catching substance is applied.

And both resonating portions 11A and 11B are immersed in or placed on the same specimen. When the substance to be sensed in the specimen reacts with and is caught by the catching substance, the mass of the diaphragm 12A of the sensing resonating portion 11A increases, and the resonant frequency of the resonating portion 11A changes corresponding to increase in the mass of the diaphragm 12A. As a result, by checking change in the resonant frequency of the resonating portion 11A, whether or not the substance to be sensed has been caught by the diaphragm 12A, that is, whether or not the substance to be sensed has been present in the specimen, and increase in the mass can be measured. In many cases, since specimens are fluids such as liquids or gases, the specimens can be tested by comparing the signals from the resonating portions 11A and 11B, without being influenced by the physical properties of the specimens such as type, and flow, and temperature of the fluid, or the testing environment.

Incidentally, when the resonating portions 11A and 11B are used as the sensing resonating portion 11A and the referencing resonating portion 11B, respectively, the adhesion of the substance to be sensed onto the referencing resonating portion 11B can be prevented, and the accuracy of measurement can be enhanced by coating the referencing resonating portion 11B with Teflon. Also in the sensing resonating portion 11A, it is preferable to coat the portion other than the diaphragm 12A with Teflon for surely catching the substance to be sensed only on the diaphragm 12A enhancing the accuracy of measurement. Furthermore, since the catching substance such as expensive antibodies is applied to a minimum necessary portion, it is also preferable for the economical reason.

On the other hand, it is possible to use a method with an expanded dynamic range by applying the same catching substance to the diaphragms 12A and 12B of the resonating portions 11A and 11B, and integrating the signals from the resonating portions 11A and 11B. Furthermore, it is also possible not to use the referencing resonating portion 11B for referencing, but applying a catching substance different from that applied to the sensing resonating portion 11A for sensing different types of substances to be sensed simultaneously.

Now, the mass sensor 10 has a structure to be arranged in the lateral direction (horizontal direction) of the sensor substrate 17 in FIG. 7, so that both the two resonating portions 11A and 11B are simultaneously immersed in the specimen, when the mass sensor 10 is immersed in a specimen of a liquid or the like, or when the diaphragms 12A and 12B are immersed in a substance to be sensed for applying the substance to be sensed to the diaphragms 12A and 12B.

Whereas, when the two resonating portions 11A and 11B are disposed in the vertical direction (up-down direction) of the sensor substrate 17, that is, when the two resonating portions 11A and 11B are disposed so that the sensing resonating portion 11A is first immersed in the liquid or the like, and the referencing resonating portion 11B is not immersed in the liquid or the like, it is easy to apply the catching substance only to the sensing resonating portion 11A, and not to apply any substance to the referencing resonating portion 11B for using it as a sensor such as a temperature compensation sensor or the like.

Figure 8:
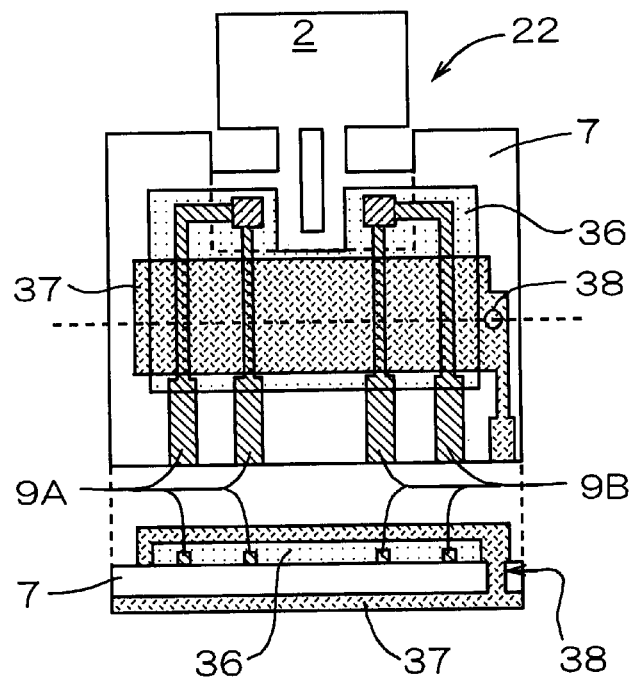
FIG. 8 is a plan view showing still another embodiment of a mass sensor of the present invention.

Successively, other embodiments of the mass sensors of the present invention will be described. The mass sensor 22 shown in the plan view of FIG. 8 is the mass sensor 1 of which the piezoelectric element 6A and 6B and the electrode leads 9A and 9B to the piezoelectric element 6A and 6B are protected by coating with an insulating member, and the insulation layer 36 is covered with a conductive member, and shielded. Noise such as external electromagnetic waves can be minimized by this shield layer 37, and improvement in measurement accuracy can be attempted. It is needless to say that the formation of such insulation layer 36 and shield layer 37 can be applied to all the mass sensors of the present invention. Incidentally, the shield layers 37 are formed on both plate surfaces of the sensor substrate 7 so as to connect electrically through the through-hole 38.

As an insulating member preferably used in the insulation layer 36, insulating resin or glass is used; however, from the point of view of shaping, the use of an insulating resin is more preferable. As particularly preferable insulating resin is fluorocarbon resins, and specifically, tetrafluoroethylene-based Teflon (Teflon PTFE), tetrafluoroethylene-hexafluoropropylene copolymer-based Teflon (Teflon FEP), tetrafluoroethylene-perfluoroalkyl vinyl ether copolymer-based Teflon (Teflon PFA), and PTFE/PFA composite Teflon are preferably used. Otherwise silicone resins (in particular, thermosetting silicone resins) can also be suitably used, and acrylate resins or epoxy resins can also be used depending on the applications. It is also preferable to form the insulation coating layer 36 using different materials respectively for the piezoelectric element 6A and 6B and its vicinity, and the electrode lead 9A and 9B and its vicinity. Furthermore, it is also preferable to add inorganic or organic fillers in the insulating resin to adjust the rigidity of the resonating portion.

On the other hand, for the conductive material for the shield layer 37, a metal is preferably used, including metallic materials feasible for forming films at low temperatures by sputtering or the like, such as aluminum, nickel, copper, palladium, silver, tin, tungsten, platinum, and gold or the like, used as alone or an alloy. Conductive pastes such as conductive adhesives containing the powder of these metals can also be used.

Figure 9A:
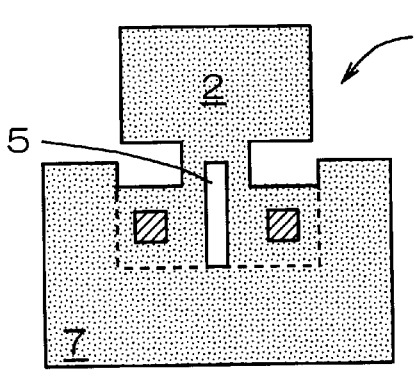
FIGS. 9(a) and (b) are plan views showing still another embodiment of a mass sensor of the present invention.
Figure 9B:
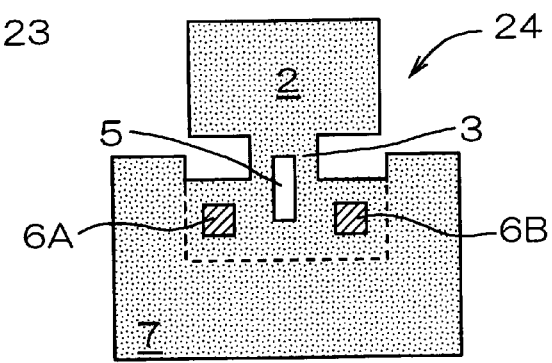

Next, FIGS. 9(a) and 9(b) are plan views showing an embodiment of the shape or the position to be disposed of which are made different in variety of fashions in a mass sensor 1. As shown in the mass sensor 23 in FIG. 9(a), with the slit 5 being formed at a position in the part of connection with the sensor substrate 7, the diaphragm 2 can easily oscillate in rigid-body modes (v mode and vz mode), which is preferable. In addition, the mass sensor 24 in FIG. 9(b) has a structure to prevent the driving force by the piezoelectric elements 6A and 6B from being absorbed by the slit 5 having been formed in the connecting plate 3. This results in making the diaphragm 2 easily oscillate in the v mode and making the resonant frequencies easily recognizable.

Figure 10A:
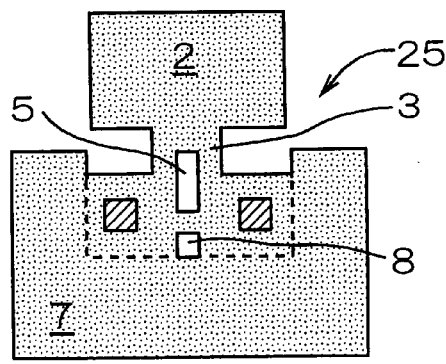
FIGS. 10(a) and (b) are plan views showing still another embodiment of a mass sensor of the present invention.

In the mass sensor 25 and 26 shown in the plan views in FIGS. 10(a) and (b) is shown an embodiment in which an opening portion 8 has been formed in addition to the slit, and formation of opening portion 8 is to reduce the mass of the connecting plate 3, and the mass ratio (i.e. the mass of the diaphragm 2 divided by the mass of the connecting plate 3) will be made larger to pursue improvement of the sensitivity. Incidentally, in the present invention, the slit 5 is referred to as a space portion having a longitudinal shape in one direction of the connecting plate 3, and on the other hand, the opening portion 8 is referred to as a space portion shaped symmetrically on a point or quasi-symmetrically on a point.

Both parts may be different in shape, but nevertheless, they have the same function.

Figure 10B:
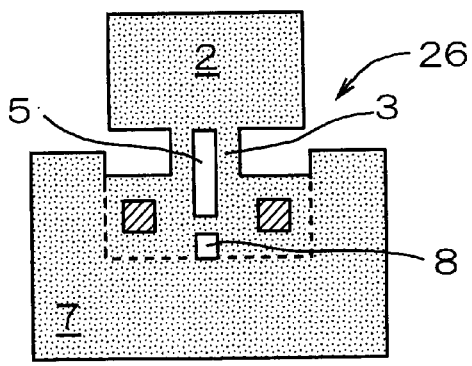
Figure 11A:
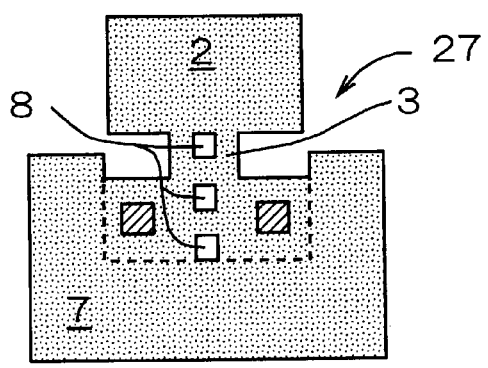
FIGS. 11(a), (b) and (c) are plan views showing still another embodiment of a mass sensor of the resent invention.
Figure 11B:
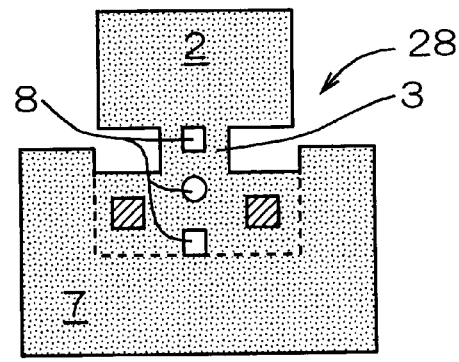
Figure 11C:
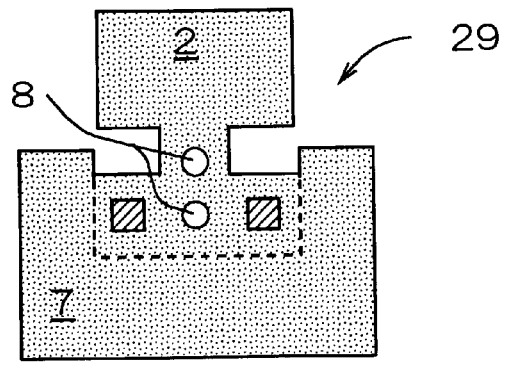

The mass sensors 27 through 29 shown in the plan views in FIGS. 11(*a*) through (*c*) show an embodiment in which a plurality of opening portions 8 have been formed instead of the slit 5, and formation of opening portions 8 is designed to reduce the mass of the connecting plate 3. The shape of the opening portions 8 is not limited to rectangular shaping as formed in the mass sensor 27, and in addition to circular shape formed in the mass sensors 28 and 29, such shapes as polygonal, ellipsoidal, or elongated circle will do as well. The opening portions 8 would be better to be formed and disposed within the connecting plate 3, and preferably formed symmetrically about the center line in the longitudinal direction of the connecting plate 3, and further preferably at the central portion in the longitudinal direction. Incidentally, in the FIGS. 9 through 11 showing the aforementioned mass sensors 23 through 29, a portion of components are not numbered. However, the structure thereof is obvious due to compatibility with the mass sensor 1.

So far, embodiments of the mass sensors of the present invention in which the slit and/or opening portion are provided on the connecting plate have been described, and for those mass sensors, thickness of the connecting plate and of the diaphragm are the same. Accordingly, making the thickness of the diaphragm thin for the purpose of increasing the sensitivity gives rise to a problem that the system is apt to break down due to shortage of intensity of the connecting plate. In addition, the resonant frequency is apt to decrease, and an attempt to attain oscillation in rigid-body modes such as v mode and vz mode, etc. gives rise to such a problem that the bending mode or rotation mode will be apt to exist in a commingled fashion.

Therefore, in the present invention, as a mass sensor to solve those problems, a mass sensor 40 shown in FIGS. 12(*a*)(*b*) is provided. In the plan view as well as the section view along the broken line A-to-A in the plan view of FIG. 12(*a*), components of the mass sensor 40 are provided with clear boundaries for each element, but as shown in FIG. 12(*b*), preferably the mass sensor 40 has an integral structure similarly to the aforementioned mass sensor 1, etc.

In the mass sensor 40, a diaphragm 2 and a connecting plate 39 comprising the thin-walled portion and the thick-walled portion are joined to each other on their respective side surfaces, and two sensing plates 4A and 4B are joined on their side surfaces with the connecting plate 39 so as to sandwich the connecting plate 39 in the direction which crosses at a right angle with the direction of joining of the diaphragm 2 and the connecting plate 39, and without the diaphragm 2 being made to join with the sensor substrate 7, the connecting plate 39 and at least one part of side surfaces of the sensing plate 4A and 4B are made to join with a part of side surfaces of the sensor substrate 7. Incidentally, also in the mass sensor 40, the piezoelectric elements 6A and 6B are provided on the sensing plate 4A and 4B, and the resonating portion has the diaphragms 2, the connecting plates 39 and the sensing plate 4A and 4B, and piezoelectric elements 6A and 6B.

The structural feature of the mass sensor 40 is the structure of connecting plate 39, and in the connecting plate 39, at least a part of a central portion in the transverse direction is formed thinner than the left-right portions in the transverse direction. Such a connecting plate 39 is formed by joining a spring plate 41A and 41B on the left and right portions of the surfaces of a thin connecting plate having the same thickness as the diaphragm 2. Accordingly, the connecting plate 39 has at the central portion in its transverse direction the same thickness as the diaphragm 2. The other component elements of the other mass sensor 40 are in accordance with the aforementioned mass sensor 1. Incidentally, the thin connecting plate and the spring plate 41A and 41B are preferably formed integrally, and as described below, can be easily fabricated by lamination using ceramic green sheets.

Incidentally, the thin-walled portion of the connecting plate 39 will not be limited to the central portion in a transverse direction, but it will do if the said portion is formed symmetrically with regard to the center line in the transverse direction.

Adopting such a structure of the connecting plate 39 makes it possible to secure the mechanical strength and reduce its mass, and thus, sensitivity is designed to be improved and the rotation mode is suppressed and the resonant frequencies in v mode and in vz mode will increase and further mechanical damage will not take place, which are preferable. In addition, when the piezoelectric elements 6A and 6B drive the diaphragm 2, no force will be absorbed by the slit as in the case where the slit is provided, and therefore the driving force will be able to be transferred to the entire connecting plate. Accordingly, these features will make it possible to suitably use the mass sensor 40, in particular, to conduct measurement in liquid.

Next, the mass sensor 49 shown in FIGS. 34(*a*)(*b*)(*c*) represents another embodiment using the spring plates 41A and 41B, and FIG. 34(*a*) is a plan view, FIG. 34(*b*) is a section view along the broken line A—A in the plan view FIG. 34(*a*), and FIG. 34(*c*) is a section view along the broken line B—B in the plan view FIG. 34(*a*) respectively. The mass sensor 49 is formed so that the thin-walled portion in the connecting plate 39 is thicker than the sensing plate 4A and 4B as well as diaphragm 2, on which point the mass sensor 49 is different in aspect from the mass sensor 40 shown in FIGS. 12(*a*)(*b*).

In the case where the connecting plate 39 having such a structure has been used, even a mass sensor having a large diaphragm, for example, can easily make the distance between the spring plates 41A and 41B larger to generate oscillation in v mode or vz mode advantageously. This is led to by the driving force of the piezoelectric elements 6A and 6B being hardly absorbed in the space portion between the separate spring plates 41A and 41B, thus by the predetermined oscillation mode becoming easier to be attained. In addition, making only thin-walled portion in the connecting plate 39 thicker compared with the sensing plate 4A, etc., it will become possible to improve sensitivity compared with the case where thickening has involved the sensing plate 4A, etc.

Incidentally, in the connecting plate 39 of the mass sensor 49, in particular, thickness of the thin-walled portion in the connecting plate 39 is preferably made thicker than the summed total of the sensing plate 4A (or 4B) and the piezoelectric element 6A (or 6B). In this case, the rigidity of the connecting plate 39 is maintained effectively, and leads to further excellent results on the both points of view of oscillation mode and sensitivity. The aforementioned structure of the connecting plate 39 in the mass sensor 49 can be applied to all the mass sensors of the present invention.

Incidentally, spring plates can be provided on the both surfaces of the thin connecting plate as in the mass sensor 42 shown in FIGS. 13(*a*)(*b*). In this case, it is preferable for the manufacturing process to use spring plates having the same structure as the piezoelectric elements 6A and 6B for the spring plates 41C and 41D formed on the side where the piezoelectric element 6A and 6B are provided, because the spring plates 41C and 41D and the piezoelectric element 6A and 6B can be formed at the same time. However, the electrodes on the spring plates 41C and 41D are not used as electrodes.

It is also preferable that the spring plates 41C and 41D on the piezoelectric element 6A side and 6B side are formed so that the bottom portions of the spring plates 41C and 41D are directly joined to the side of the sensor substrate 7, or joined to the side of a spring plate reinforcing member 43 joined on the sensor substrate 7. The material of the spring plate reinforcing member 43 is preferably the same as that for either the sensor substrate 7 or the piezoelectric elements 6A and 6B.

When the spring plates 41A through 41D are formed, in either case where they are joined on one side or on both sides of the thin connecting plate, the thickness is preferably 10 to 220 μm, the width is preferably 50 to 500 μm, and the aspect ratio (width/thickness) is preferably in a range between 0.2 and 50. When the attenuation of oscillation amplitude by the use of the mass sensors 40 and 42 in a liquid is considered, the thickness is preferably 10 to 70 μm, the width is preferably 50 to 500 μm, and the aspect ratio is preferably 0.7 to 50. More preferably, the thickness is 10 to 70 μm, the width is 50 to 300 μm, and the aspect ratio is 0.7 to 30. Incidentally, the thickness of the spring plate reinforcing member 43, when such a spring plate reinforcing member 43 is provided, is preferably the same as the thickness of the spring plates 41C and 41D being joined to the spring plate reinforcing member 43.

Figure 14A:
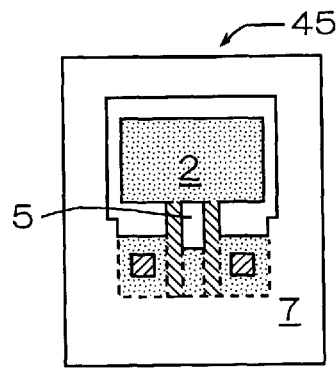
FIGS. 14(a), (b) and (c) are plan views showing still another embodiment of a mass sensor of the present invention.
Figure 14B:
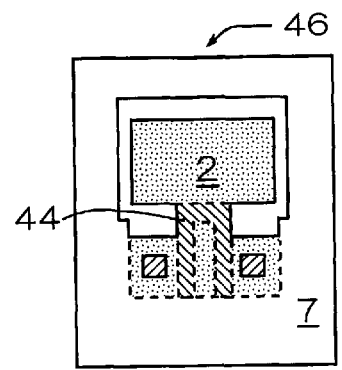
Figure 14C:
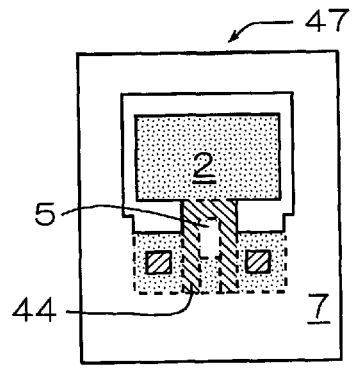
Figure 15A:
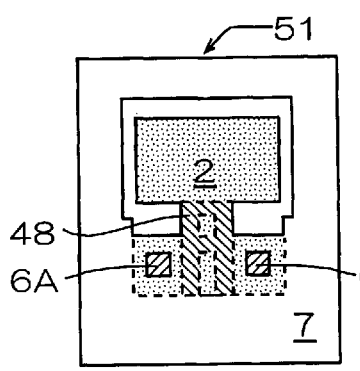
FIGS. 15(a), (b), (c), (d) and (e) are plan views showing still another embodiment of a mass sensor of the present invention.
Figure 15B:
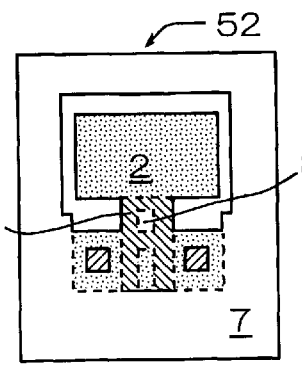
Figure 15C:
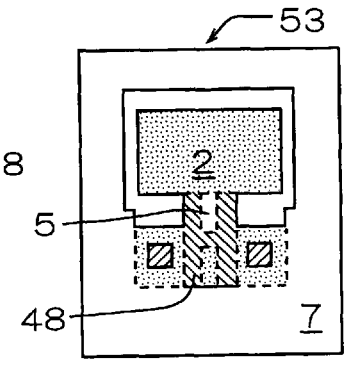
Figure 15D:
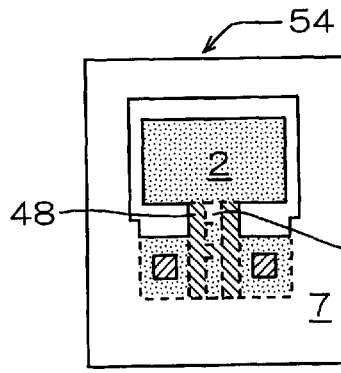
Figure 15E:
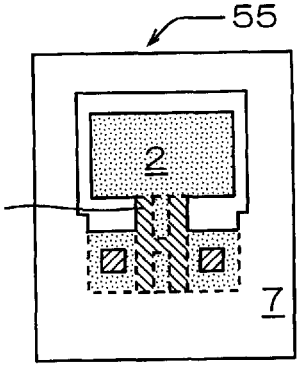

FIGS. 14(a) through (c) a plan view showing another embodiment of the mass sensor using a spring plate. The mass sensor 45 has a slit 5 in the thin connecting plate part of the central portion locating at a transverse center and extending in the longitudinal direction of the connecting plate 39 in the mass sensor 40. Forming such slit 5 can improve the sensitivity by reducing the mass of the connecting plate 39, and enable oscillation of the diaphragm in v mode as well as vz mode, and reduce the difference in sensitivity due to difference in mass change position inside the diaphragm 2 to make highly accurate measurement possible.

In addition, the mass sensor 46 has the spring plate 44 having a structure that the spring plates 41A and 41B are connected to each other at one portion, resulting in making the diaphragm 2 oscillate more easily in a rigid-body mode. Moreover, the mass sensor 47 is provided with a slit 5 in the thin connecting plate portion of the connecting plate 39 in the mass sensor 46, and providing the slit 5 was intended to make oscillation take place more easily in the v and vz modes.

The mass sensors 51 through 55 shown in FIGS. 15(a) through (e) show embodiments having the spring plate 48 in which the spring plates 41A and 41B in the mass sensor 40 are connected at one portion or a plurality of portions, and as required comprise the slit 5 or opening portion 8. These mass sensors 51 through 55 prevent the driving force of the piezoelectric elements 6A and 6B from being absorbed by the space portion formed at the center of the spring plate 48 and enable the diaphragm 2 to oscillate easily in the rigid-body mode, and thus make recognition of the resonant frequencies easy.

Figure 16:
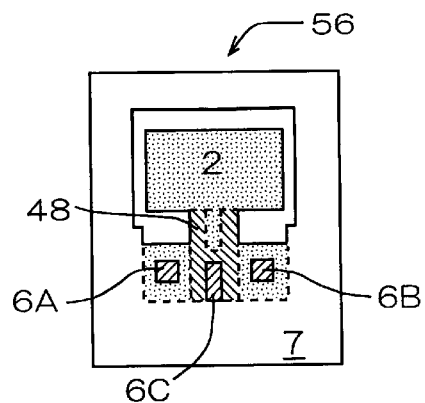
FIG. 16 is a plan view showing still another embodiment of a mass sensor of the present invention.

The mass sensor 56 shown in FIG. 16 is the one with the piezoelectric element for sensing 6C being further provided on the surface of the connecting plate of the mass sensor 55. In this case, the diaphragm 2 is driven by use of the piezoelectric elements 6A and 6B provided on the sensing plate 4A and 4B, and sensing is conducted by the piezoelectric element for sensing 6C, thus the S/N ratio is preferably designed to be improved. Incidentally, in the FIG. 12 through FIG. 16 showing the aforementioned mass sensors 42, 45 through 47, and 51 through 55, a portion of components are not numbered. However, the structure thereof is obvious due to compatibility with the mass sensor 40.

Figure 17:
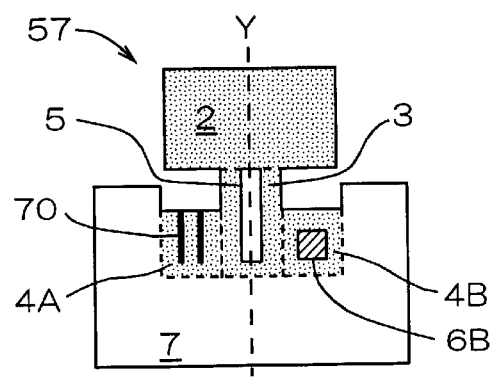
FIG. 17 is a plan view showing still another embodiment of a mass sensor of the present invention.

The mass sensor 57 shown in FIG. 17 shows an embodiment without the piezoelectric element 6A being provided in the sensing plate 4A of the mass sensor 1, but with the slit 70 having been formed instead. Here, the slit 70 is formed in the direction perpendicular to the joining direction of the connecting plate 3 and the sensing plate 4A, that is, in parallel to Y-axis direction. With such a structure, Q value of v mode and vz mode will be able to be increased.

Incidentally, such a slit is applied to all the mass sensors of the present invention, wherein two sensing plates are provided so as to sandwich the connecting plate. In addition, in the present invention, the slit to be formed in the sensing plate does not necessarily comprise a broad space such as a slit to be formed in the connecting plate, and, for example, a line-shaped slit will do, and at least one slit to be formed will do, but preferably a plurality of slits to be formed will lead to the aforementioned result to a larger extent.

Figure 18:
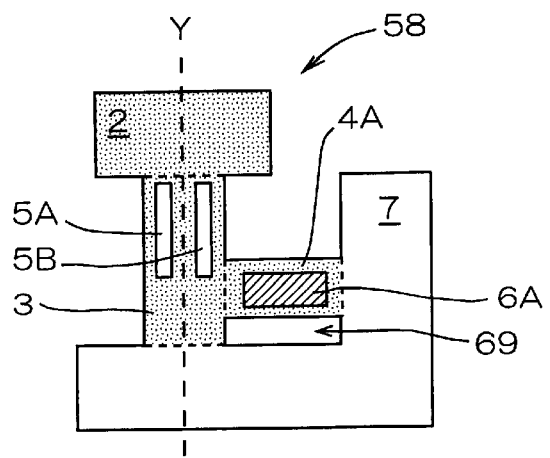
FIG. 18 is a plan view showing still another embodiment of a mass sensor of the present invention.

Next, FIG. 18 shows a plan view of the mass sensor 58 using only one sensing plate, and in the connecting plate 3, two slits 5A and 5B are formed with Y-axis being the central axis in the longitudinal direction of the connecting plate 3 as the symmetrical axis. And in the mass sensor 58, a diaphragm 2 and a connecting plate 3 are joined each other on their respective side surfaces, and the sensing plate 4A on the one surface of which the piezoelectric element 6A is provided is joined on the side surface with the connecting plate 3 in the direction which crosses at right angle with the direction of joining between the diaphragm 2 and the connecting plate 3, and with the connecting plate 3 being made to join with one side surface of the sensor substrate 7, and the resonating portion is constituted by the diaphragms 2, the connecting plates 3 and the sensing plate 4A, and piezoelectric elements 6A. Here, a mode of joining the connecting plate 3 and the sensing plates 4A with the sensor substrate 7 (position relationship of joining side surfaces) is obviously similar to the case of the aforementioned mass sensor 1 when FIG. 1 and FIG. 18 are compared.

Incidentally, in the mass sensor 58 the gap portion 69 is formed by being enclosed by the sensing substrate 7, the connecting plate 3 and the sensing plate 4A. Forming such a gap portion 69 enables the attenuation of wave forms (signal) being measured to be prevented when measurement takes place in a liquid. But, in the case where such advantage is not required or the like, the sensing plate 4A may be joined with the sensor substrate 7 on the two edges without providing the gap portion 69.

Figure 19:
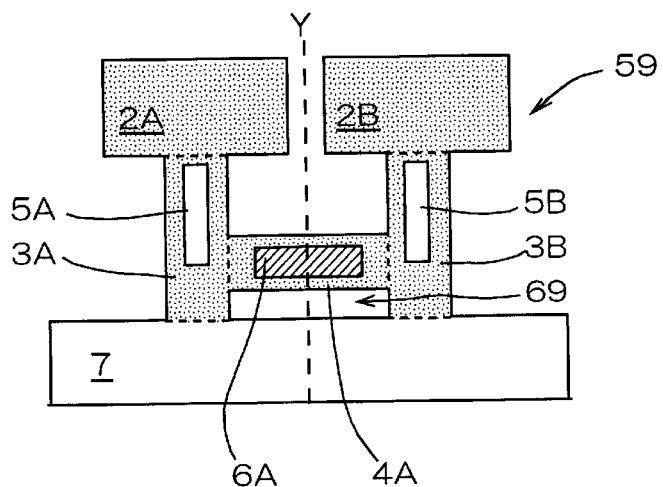
FIG. 19 is a plan view showing still another embodiment of a mass sensor of the present invention.

In succession, FIG. 19 shows a plan view of the mass sensor 59 using two diaphragms. The slits 5A and 5B are respectively formed in the first connecting plate 3A and the second connecting plate 3B. And in the mass sensor 59, the first sensing plate 4A on the one surface of which the piezoelectric element 6A is bridged across the gap between the first connecting plate 3A which is joined with the first diaphragm 2A at respective side surfaces thereof, and the second connecting plate 3B which is joined with the second diaphragm 2B at respective side surfaces thereof, and at least one part of the side surface of the first connecting plate 3A and the second connecting plate 3B, that is, the opposite side surface against the joint side surface with the diaphragm is joined with the sensor substrate 7. The resonating portion comprises the diaphragms 2A and 2B, the connecting plates 3A and 3B, the first sensing plate 4A and the piezoelectric element 6A. The gap portion 69 is also provided in the mass sensor 59, but the structure that the sensing plate 4A is joined with the sensor substrate 7 directly may be adopted.

With slits 5A and 5B being inserted as shown in the mass sensor 59, the structure that two diaphragms 2A and 2B are provided therein can reduce the difference in sensitivity due to the difference in the mass change positions in the diaphragms 2A and 2B, and also the quantity of oscillation of the diaphragms 2A and 2B becomes larger and the improvement in sensitivity is designed.

It is needless to say that in these mass sensors 57 through 59, instead of the connecting plates with slits having been formed, the connecting plates comprising the thin-walled portions and thick-walled portions can be used. In addition, as in the mass sensors 57 through 59, in the structure having only one sensing plate in which the piezoelectric element is provided, it is preferable on the point of view of improvement in sensitivity to provide the piezoelectric elements on the both surfaces of the sensing plate respectively and to use one for driving, and the other for sensing. In addition, it is preferable to divide one of piezoelectric elements which has been formed on one surface of the sensing plate into two in the Y-axis direction, and use the piezoelectric element at the diaphragm partly for driving, and the other for sensing. Such division of a piezoelectric element can be implemented by laser processing or the like described later, or otherwise the previously divided piezoelectric elements can be provided when the system is formed.

Figure 20:
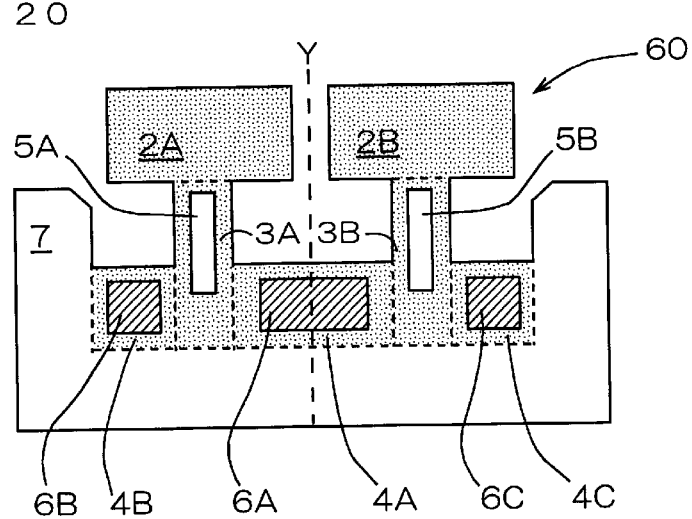
FIG. 20 is a plan view showing still another embodiment of a mass sensor of the present invention.

Incidentally, in the mass sensor 59, it is possible further to provide a second sensing plate and a third sensing plate, and a plan view of the mass sensor 60 of an embodiment thereof is shown in FIG. 20. In the mass sensor 60, the second sensing plate 4B and the first sensing plate 4A sandwich the first connecting plate 3A, and the third sensing plate 4C and the first sensing plat 4A sandwich the second connecting plate 3B, and the second sensing plate 4B and the third sensing plate 4C are respectively joined with the sensor substrate 7.

Here, the structure that only one of the second sensing plate 4B and the third sensing plate 4C is provided will do. The piezoelectric element can be formed in all the sensing plates, but when a plurality of piezoelectric elements are provided, it is preferable that at least one piezoelectric element is used for driving and at least another for sensing. Moreover, it is also preferable that the piezoelectric element is not provided in the second sensing plate 4B and the third sensing plate 4C, and the slit 70 is formed as in the mass sensor 57.

Figure 21:
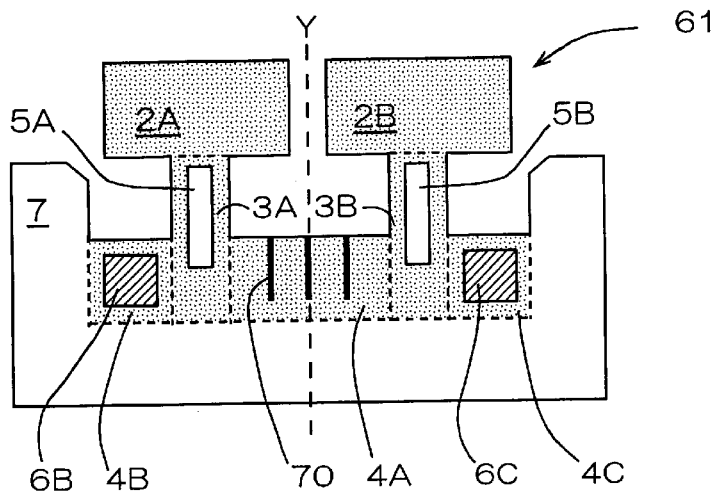
FIG. 21 is a plan view showing still another embodiment of a mass sensor of the present invention.

Next, FIG. 21 is a plan view of the mass sensor 61 being further another embodiment of the present invention, and briefly speaking, the mass sensor 61 has a structure that the slits 70 have been formed instead of the piezoelectric element 6A in the first sensing plat 4A in the aforementioned mass sensor 60. In further detail, in the mass sensor 61, the first connecting plate 3A and the second connecting plate 3B have respectively the slit 5A and the slit 5B, the first sensing plate 4A is bridged across the gap between the first connecting plate 3A being joined with the first diaphragm 2A on the side surfaces each other and the second connecting plate 3B being joined with the second diaphragm 2B on the side surfaces each other, and the second sensing plate 4B and the first sensing plate 4A are joined with the first connecting plate 3A so as to sandwich the first connecting plate 3A, and the third sensing plate 4C and the first sensing plate 4A are joined with the second connecting plate 3B so as to sandwich the second connecting plate 3B on the side surfaces each other. In addition, the piezoelectric elements 6B and 6C are provided on the surface(s) of at least either one of the respective second sensing plate 4B and the third sensing plate 4C, the first connecting plate 3A and the second connecting plate 3B sharing with the first diaphragm 2A and the second diaphragm 2B the joint side surfaces, the opposite side surfaces of which are joined with the bottom side surface of the recessed portion 58 having been provided in the sensor substrate 7, and the second sensing plate 4B and the third sensing plate 4C are joined with the side surface of the recessed portion 68.

The first sensing plate 4A comprises the slit 70 to be formed in the perpendicular direction toward the bridging direction of the first sensing plate 4A, that is, the Y-axis direction, and similar to the aforementioned mass sensor 57, the mass sensor 61 has a feature so as to increase the Q value of v mode and vz mode. At least one slit 70 will do, but preferably, approximately a plurality of them are to be formed. However, even if the slit 70 is not formed, it can be used to a sufficient extent. The mass sensor 61 with this slit 70 having been provided is preferably symmetrical with the Y-axis so as to suppress the difference in sensitivity of two diaphragms 2A and 2B to a small level.

Figure 22:
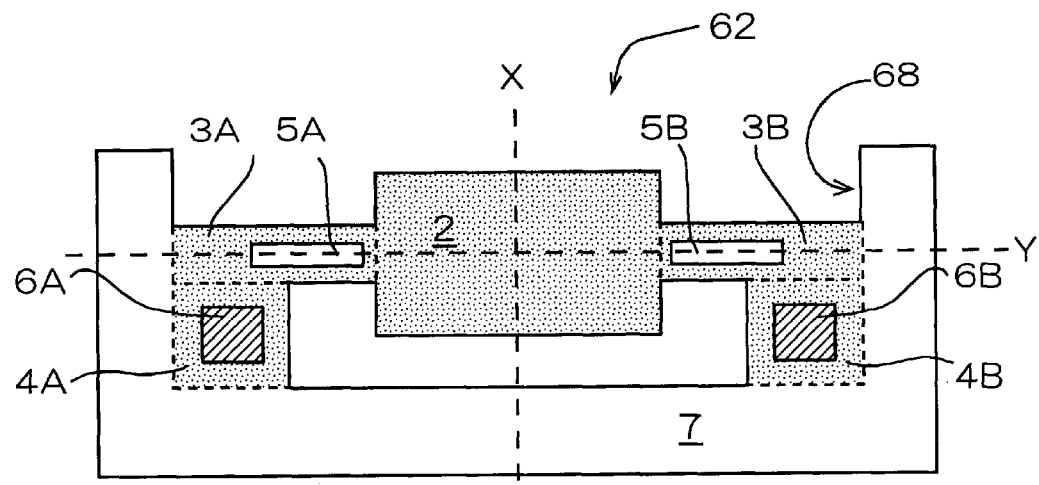
FIG. 22 is a plan view showing still another embodiment of a mass sensor of the present invention.

In succession, FIG. 22 shows a plan view showing further another embodiment of the mass sensor of the present invention. In the mass sensor 62, the two connecting plates 3A and 3B in which the slits 5A and 5B are respectively formed sandwich the diaphragm 2 being joined at the side surfaces each other, which portion is bridged across the gap between the side surfaces of the recessed portion 68 having been provided in the sensor substrate 7, and the sensing plates 4A and 4B with the piezoelectric elements 6A and 6B having been provided respectively therein respectively are bridged across the gap in the direction perpendicular to the joining direction of the connecting plates 3A and 3B and diaphragm 2, that is, the X-axis direction, between the bottom side surface of the recessed portion 68 and the side surfaces of the connecting plates 3A and 3B. The resonating portion comprises the diaphragm 2, the connecting plates 3A and 3B, the sensing plate 4A and 4B, and the piezoelectric elements 6A and 6B.

The mass sensor 62 can increase the amplitude in the uniaxial direction oscillation in the X-axis direction, and the sensitivity is designed to be improved. However, the rotational mode with the Y-axis being the center also is easily taken, which is a problem. Under the circumstances, next as shown in FIG. 23, the sensing plates 4A through 4D are provided so as to sandwich the connecting plate 3A and 3B so as to preferably suppress the rotational mode.

Figure 23:
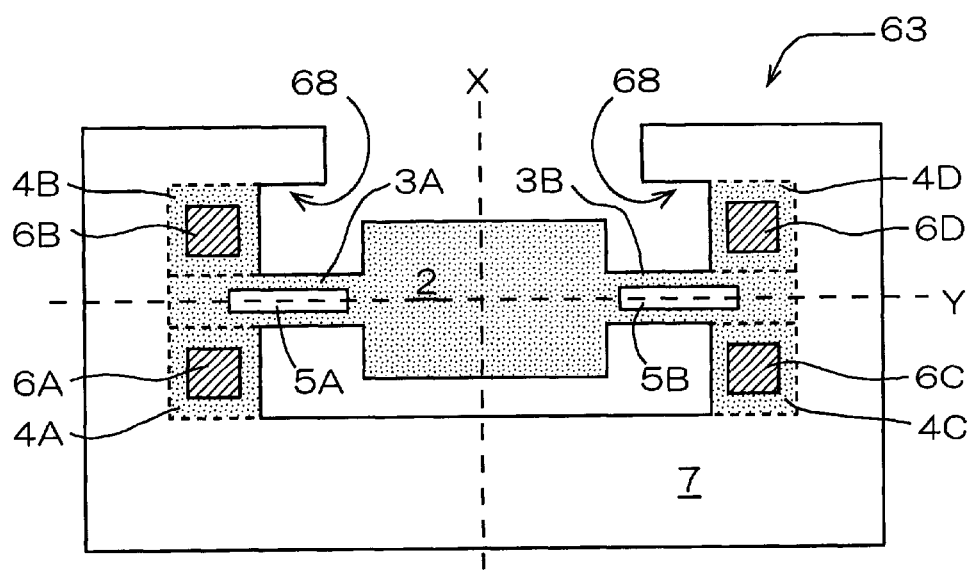
FIG. 23 is a plan view showing still another embodiment of a mass sensor of the present invention.

That is, in the mass sensor 63 shown in the plan view of FIG. 23, at first, for two connecting plates 3A and 3B, the slits 5A and 5B are formed in the center of the transverse direction of the connecting plates 3A and 3B. Here, instead of the slits 5A and 5B, the opening portions may be formed, and/or the connecting plates comprising the thin-walled portion and the thick-walled portion may be used. And, the connecting plates 3A and 3B are joined with the diaphragm 2 so as to sandwich the diaphragm 2 at their side surfaces each other, and the respective side surfaces of the connecting plates 3A and 3B are bridged to the side surfaces of the opposite recessed portion 68 having been provided in the sensor substrate 7. And, as concerns respective connecting plates 3A and 3B, two sensing plates (4A and 4B) and (4C and 4D) are joined with the connecting plates 3A and 3B in the perpendicular direction with the joining direction of the connecting plates 3A and 3B and the diaphragm 2 so as to sandwich the connecting plates 3A and 3B, and are bridged with the side surfaces of the recessed portion 68 at least in the direction sandwiching the connecting plates 3A and 3B. On one surface each of the sensing plates 4A through 4D, the piezoelectric elements 6A through 6D are provided. The diaphragm 2, the connecting plates 3A and 3B, the sensing plates 4A through 4D and the piezoelectric elements 6A through 6D forms the resonating portion.

In the mass sensor 63 having such a structure, the diaphragm 2 is more prone to oscillate in the X-axis direction. That is, in the aforementioned v mode, oscillation is prone to take place under the oscillation mode nearly completely excluding the component in the Y-axis direction, and the sensitivity distribution based on the difference of the mass change positions in the diaphragm 2 can be made small, and similarly, in the mass sensor 63, the area of the diaphragm usable as a sensor can be increased.

Incidentally, it is also preferable to provide the piezoelectric elements 6A and 6C in the sensing plates 4A and 4C, and provide the sensing plates 4B and 4D with the slits 70 as in the mass sensor 58 without providing the piezoelectric elements. Provision of the slits 70 may include such aspect that the piezoelectric elements 6A and 6D are provided in the sensing plates 4A and 4D, and the slits 70 are provided in the sensing plates 4B and 4C. In addition, the resonating portion may be formed so that the through hole instead of the recessed portion 68 is provided in the sensor substrate 7 and are bridged to the side surfaces thereof. Previously described various aspects of providing piezoelectric element are applicable to the aspect of providing piezoelectric elements to the sensing plates 4A through 4D.

Now, in the mass sensor 64 shown in a plan view (a) as well as a section view (b) along the broken line A—A in the plan view in FIGS. 30(a)(b), the sensing plates 4A and 4B as well as the piezoelectric elements 6A and 6B in the mass sensor 40 previously shown in FIGS. 12(a)(b) are shaped as a convex shape protruding toward the parts of the sensing plates 4A and 4B under the state without drive voltage being applied to the piezoelectric elements 6A and 6B. As the piezoelectric elements 6A and 6B in this case, it is preferable that the piezoelectric element 88 of the type using $d_{31}$ shown in FIG. 2 is provided.

In the mass sensor 65 shown in a plan view FIG. 31(a) as well as a section view FIG. 31(b) along the broken line A—A in the plan view in FIGS. 31(a)(b), the slit 5 is not provided in the connecting plate 3 in the mass sensor 1 shown in FIGS. 1(a)(b), and the sensing plates 4A and 4B as well as the piezoelectric elements 6A and 6B in the mass sensor 1 are shaped as a convex shape protruding toward the parties of the piezoelectric elements 6A and 6B under the state without drive voltage being applied to the piezoelectric elements 6A and 6B. In this case, it is preferable that the piezoelectric element 94A and 94B of the type using $d_{33}$ shown in FIG. 3 or 4 are provided.

In succession, the mass sensor 66 shown in a plan view FIG. 32(a) as well as a section view FIG. 32(b) along the broken line A—A in the plan view in FIGS. 32(a)(b) has a structure that, in the mass sensor 60 previously shown in the FIG. 20, the sensing plates 4A through 4C as well as the piezoelectric elements 6A through 6C are shaped as a convex shape protruding toward the parties of the sensing plates 4A through 4C under the state without drive voltage being applied to the piezoelectric elements 6A through 6C. When bending takes place convex-shaped to the parties of the sensing plates 4A through 4C, similar to the aforementioned mass sensor 64, as the piezoelectric elements 4A through 4C, it is preferable that the piezoelectric element 88 of the type using $d_{31}$ shown in FIG. 2 is provided.

FIG. 33(a) shows the structural outlines of as well as a section view and FIG. 33(b) a view along the broken line A—A in the plan view of the mass sensor 67. The mass sensor 67 has a structure that the slit 5A and 5B are not formed in the connecting plate 3A and 3B in the mass sensor 59 previously shown in FIG. 19, and the sensing plates 4A as well as the piezoelectric elements 6A are shaped as a convex shape protruding toward the parts of the sensing plate 4A under the state without drive voltage being applied to the piezoelectric elements 6A. As the piezoelectric elements 6A, similar to the mass sensor 64, it is preferable that the piezoelectric element 88 of the type using $d_{31}$ shown in FIG. 2 is provided.

Thus, in the mass sensors of the present invention, as shown in the mass sensors 64 through 67, these are cases where the sensing plates and a piezoelectric elements are preferably shaped convexly in advance. In addition, for the devices comprising a plurality of sensing plates and piezoelectric elements, all the sensing plates and the piezoelectric elements do not need to be convex shape protruding toward the same direction, but the protruding directions can be selected in an appropriate way considering aspects of piezoelectric elements to be provided, etc.

So far, various embodiments of the mass sensors according to the present invention have been described above, and now the method for fabricating a mass sensor of the present invention will be described using the mass sensor 40 as an example. As the materials of the sensor substrate 7, ceramics such as zirconia are suitably used. A slurry is produced by mixing a binder, solvent, dispersing agent, and other additives in ceramic powder, and after removing foams from the slurry, a green sheet or a green tape for the diaphragms, intermediate plates and base plates having desired thickness using a method such as the reverse roll coater method and the doctor blade method is formed. In the case of the mass sensor 1 in which the spring plates 41A and 41B is not provided, it is not required to produce the green tape for intermediate plates.

Figure 24:
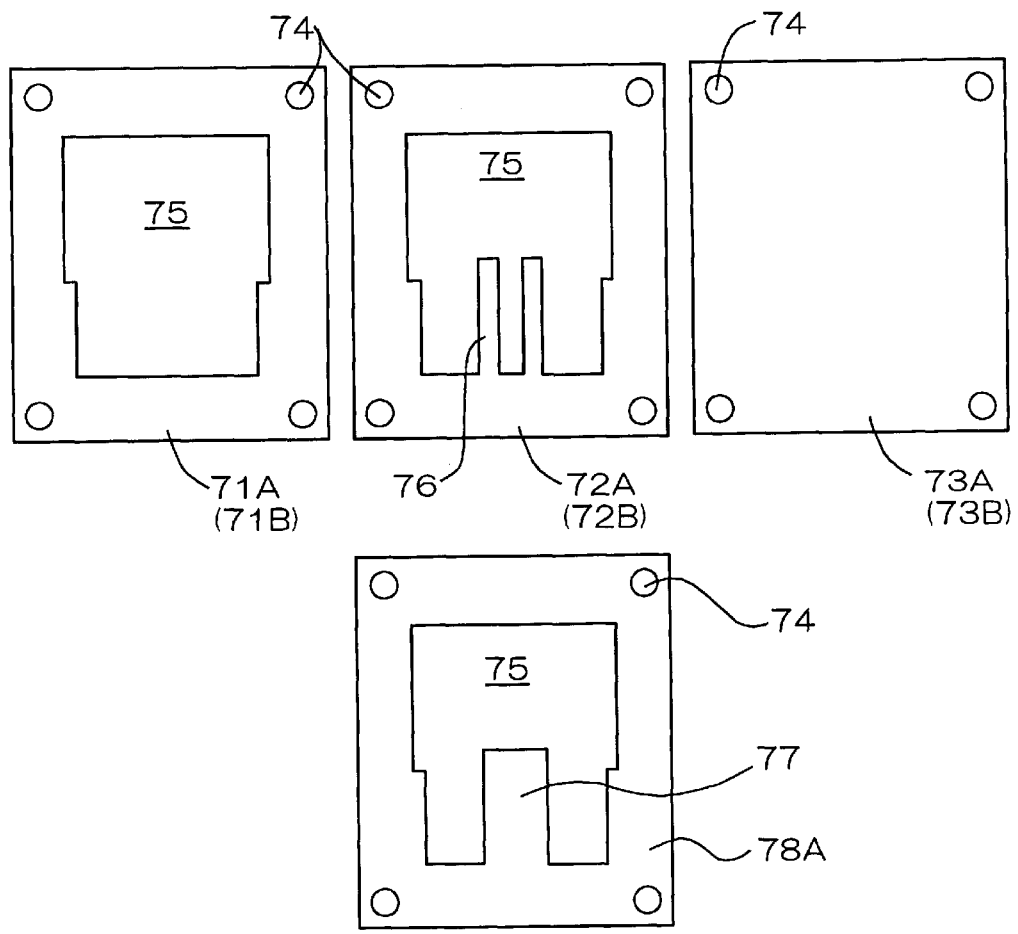
FIG. 24 is a plan view showing an example of processing a green sheet for a sensor substrate used in the fabrication of a mass sensor of the present invention.

Next, these green sheets or the like are punched using a die or laser to form a green sheet 72A for an intermediate plate having as shown in FIG. 24 a reference hole 74, openings 75, and a spring plate 76, a green sheet 71A for a base plate having a reference hole 74, and an opening 75, and a green sheet 73A for a vibrating plate having a reference hole 74.

Here, although portions to become the opening 75 or the diaphragm 2 can be formed in the green sheet 73A for a vibrating plate, since the green sheet 73A for a vibrating plate is usually as thin as 10 μm, it is preferable to obtain the desired shape using laser or the like after the sensor substrate 7 has been formed and the piezoelectric elements 6A and 6B have been provided, for securing the flatness and the dimensional accuracy of the diaphragm 2, the connecting plate 39, or the sensing plates 4A and 4B formed in the vibrating plate 73B after sintering. The vibrating plate 73B is a vibrating plate obtained by sintering the green sheet 73A for a vibrating plate.

The green sheets 71A to 73A fabricated as described above are stacked one by one in the order of that for a vibrating plate, for an intermediate plate, and for a base plate so as to align the locations of reference holes 74, integrated by applying a heat and a pressure or the like, and sintered. Thus, there is formed a sensor substrate 7 in which each of the green sheets 71A to 73A is laminated, and the peripheral portion is integrally formed; and a connecting plate 39 is integrally formed from the laminated portion of the vibrating plate 73B and the intermediate plate 72B with the spring plate 76.

Incidentally, for the purpose of forming the thin-walled portion of the connecting plate 39 thicker than the sensing plate 4A, etc., as in the aforementioned mass sensor 49, it is advisable that the green sheet for vibrating plate 73A and the green sheet for an intermediate plate 72A similarly sandwich the green sheet 78A for an intermediate plate in which a bump or projected portion 77 with width of the connecting plate 39 as shown in FIG. 24 has been formed, being laminated, integrated, and sintered.

Next, the method for placing a piezoelectric elements 6A and 6B consisting of a first electrode, a piezoelectric film, and a second electrode on the predetermined location of the vibrating plate will be described. A structure of the piezoelectric elements 6A and 6B has already been shown in FIGS. 2 to 4. The piezoelectric elements 6A and 6B can be placed using various forming methods depending on the state before or after sintering the green sheets 71A to 73A. First, forming methods before sintering the green sheets 71A to 73A include a method in which a piezoelectric film is formed by press molding using a mold or tape forming using a slurry material, and the piezoelectric film before sintering is laminated on the predetermined location of the green sheet 73A for a vibrating plate, and is integrally sintered together with other green sheets 71A and 72A. In this case, it is required to form the electrode previously on the green sheet 73A for a vibrating plate or on the piezoelectric film by the film forming method described below.

Although the temperature for sintering the piezoelectric film is determined depending on the constituting material, it is generally 800° C. to 1400° C., preferably 1000° C. to 1400° C. In this case, it is preferable for controlling the composition of the piezoelectric film, that sintering is conducted under a controlled atmosphere in the presence of the evaporation source of the material for the piezoelectric film. It is preferable that the above-described atmosphere is controlled for relieving the sintering stress of the piezoelectric film when the sensor substrate after sintering is used as described later, and for obtaining higher material properties, by observing the piezoelectric film after sintering with an electron microscope or the like, and monitoring the distribution of components.

For example, when materials containing lead zirconate is used such as a material containing lead zirconate, lead titanate, and lead magnesium niobate as its main components, which is a piezoelectric ceramic material preferably used in the present invention, it is preferable to adjust the atmosphere and sinter so that the zirconium component segregates in the sintered piezoelectric film. It is further preferable to adjust the atmosphere so that the segregation of the zirconium component is observed on the surface of the piezoelectric film, and is hardly observed inside the piezoelectric film. Since the piezoelectric film having such a component distribution has more excellent oscillation characteristics, that is a larger oscillation amplitude than piezoelectric films without segregation, and sintering stress is relieved by the segregation of zirconium components, material properties that the powder of the piezoelectric materials inherently possesses are maintained without lowering significantly.

Therefore, it is preferable in the mass sensors of the present invention to form the piezoelectric element having such a piezoelectric film. It is also preferable to use the above-described piezoelectric film composition, as well as to sinter the atmosphere so that the components of the piezoelectric material, when the piezoelectric material contains the above described titanium oxide, the titanium oxide is contained after sintering in every member of the mass sensor, such as the connecting plate, the spring plate, and the sensor substrate. When the sintering of the piezoelectric film and the sintering of the sensor substrate are performed at the same time, it is required to match the both sintering conditions. Such a piezoelectric film can be suitably applied not only to mass sensors, but also to devices having film-type piezoelectric elements as a component, such as actuators and sensors.

On the other hand, various film forming methods can be used for providing the piezoelectric elements 6A and 6B on the sensor substrate 7 after sintering. The examples of the methods include various thick film forming methods, such as screen printing, dipping, coating, and electrophoresis; or various thin film forming methods, such as the ion beam method, sputtering, vacuum deposition, ion plating, chemical vapor deposition (CVD), or electroplating. Among these, for the formation of the piezoelectric film in the present invention, thick film forming methods using screen printing, dipping, coating, and electrophoresis are preferably used. These methods are used for forming the piezoelectric film using a paste, a slurry, a suspension, an emulsion, or a sol consisting mainly of the particles of piezoelectric ceramics having an average particle size of 0.01 to 5 $\mu$m, preferably 0.05 to 3 $\mu$m, and despite of simple methods, favorable piezoelectric properties can be obtained. Electrophoresis is advantageous for forming films having high density and high dimensional accuracy, and has features as described in the article of Kazuo Anzai, "DENKI KAGAKU," 53, No. 1 (1985), pp. 63–68. Accordingly, some methods may be suitably selected and used in view of the accuracy of request and reliability or the like.

Specifically, after the sensor substrate 7 has been sintered, the first electrode is printed and sintered on the predetermined surface area of the vibrating plate 73B, then the piezoelectric film is printed and sintered, and further, the second electrode is printed and sintered to form the piezoelectric elements 6A and 6B. Then, electrode leads (9A and 9B) are printed and sintered for connecting the respective electrodes to the measurement apparatus. Here, for example, if platinum (Pt) is used for the first electrode, Lead zirconate titanate (PZT) is used for the piezoelectric film, gold (Au) is used for the second electrode, and silver (Ag) is used for the electrode leads, sintering temperatures in the sintering process can be lowered stepwise. Therefore, the previously sintered materials are not re-sintered in the sintering step of a certain material, and the occurrence of troubles in the material for electrodes or the like, such as peeling off and breaking due to aggregation, can be avoided.

By selecting suitable materials, the respective members and leads for the piezoelectric element 6A and 6B can be printed one after the other, and the piezoelectric element 6A and 6B can be integrally sintered at once. It is also possible to print respective members and electrode leads for the piezoelectric element 6A and 6B on after the other on a green sheet 73A for a vibrating plate, and to sinter it integrally with other green sheets 71A, and 72A. Furthermore, it is also possible to provide each of electrodes or the like at low temperature after having formed the piezoelectric film. Also, the respective members and electrode leads of the piezoelectric element 6A and 6B can be formed by a thin film forming method, such as sputtering or vapor deposition. In this case, heat treatment is not necessarily required.

Thus, the piezoelectric elements 6A and 6B are to be formed using the above-described various film formation methods since the piezoelectric elements 6A and 6B and the sensing plates 4A and 4B can be integrally joined and installed without using adhesives, and the mass sensor excels in reliability and reproducibility, and is easily integrated. Here, the piezoelectric film may be suitably patterned, and the methods for patterning include, for example, screen printing, photolithography, laser processing, or mechanical processing such as slicing and ultrasonic processing.

Next, a diaphragm 2, sensing plates 4A and 4B, or the like are formed on the predetermined area of thus formed sensor substrate. Here, it is preferable to remove the unnecessary part of the vibrating plate 73B leaving the site integrally joined to the sensor substrate 7, such as the diaphragm 2 and sensing plates 4A and 4B by trimming using the fourth harmonic of YAG laser. At this time, by adjusting the form of the diaphragm 2 or the like the resonant frequency of the resonating portion can be adjusted to a predetermined value, and the mass range of the detectable substance to be sensed can be determined. It is also possible to form the slit 5 and the cavity portion 8 easily.

Incidentally, the shape of the diaphragm 2 is not limited to rectangular, but the diaphragm 2 can also be trimmed during shape forming to become various shapes, such as circular, inverted triangular, and polygonal. That is, the shape of the diaphragm 2 in the mass sensors of the present invention is not limited to a particular shape, but can be adequately determined for saving the space for installing the diaphragm 2, and for increasing the area of the diaphragm 2.

Figure 25:
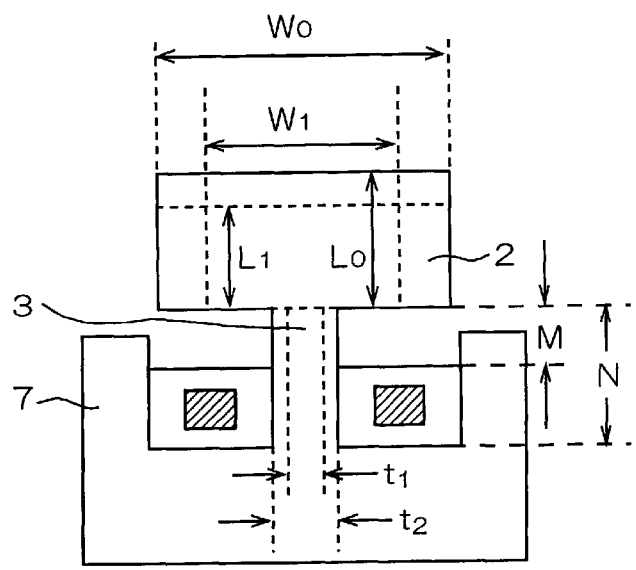
FIG. 25 is a diagram illustrating the dimensions and the shape preferably to be adjusted when a mass sensor of the present invention is fabricated.

Now, here, as shown in FIG. 25, a portion of the diaphragm 2 is cut or deleted so as to shorten the length of the diaphragm 2 from $L_0$ to $L_1$, then the resonant point can increase, and on the other hand to narrow the width of the connecting plate 3 from $t_2$ to $t_1$, then the resonant frequency can decrease. Accordingly, combination of these enables the adjustment of the resonant frequency. Moreover, by narrowing the width of the diaphragm 2 from $W_O$ to $W_1$, the rotational mode can be suppressed, and increase the Q value of v mode and vz mode, and make smaller the variation in the resonant frequencies according to the attachment position with a same mass.

In addition, likewise as shown in FIG. 25, the aspect of oscillation depends on the length N of connecting plate 3, and the distance M between the diaphragm 2 and the sensing plates 4A and 4B as well. In general, designing with both of M and N being lengthened can make the oscillation under v mode or vz mode dominant, and preferably the improvement of Q value under the said oscillation mode can be designed, on the other hand, leading to decreasing the resonant frequency. Accordingly, it is preferable to combine this shape setting of the connecting plate 3 and the aforementioned shape setting of the diaphragm 2 to adjust to the sensitivity in accordance with the purpose.

Furthermore, as FIG. 26 shows, when a piezoelectric element 88 shown in FIG. 2 is installed, the upper second electrode 87 can be trimmed by the fourth harmonic of YAG laser to adjust the available electrode area of the piezoelectric element 88 and adjust sensitivity. When the structure of the piezoelectric element is a comb structure as shown in FIG. 3 or 4, part of one or both electrodes may be trimmed.

In processing such a resonating portion or piezoelectric elements 6A and 6B, various processing methods suitable for the size and shape of the resonating portion, such as laser processing with YAG laser, the second or third harmonic of YAG laser, excimer laser, or $CO_2$ laser; electron beam processing; and dicing (machining), in addition to the fourth harmonic of YAG laser described above. In addition to the method using green sheets as described above, the sensor substrate 7 can be produced by the molding, casting, or injection using molds. In these cases also, machining such as cutting, grinding, laser processing, and ultrasonic processing is conducted before and after sintering, and the mass sensor of a predetermined shape is obtained.

When the piezoelectric elements 6A and 6B and electrode leads (9A and 9B) in thus fabricated mass sensor 40 are insulated, an insulation layer 36 can be formed by screen printing, coating, or spraying. Here, when glass is used as the material for insulation, the entire mass sensor 40 must be heated to the softening point of the glass, and since glass has a high hardness, oscillation may be inhibited. However, since the resin is soft, and only such low temperature processing as drying is required, the use of a resin is preferable for both manufacturing processes and oscillation properties. When fluorocarbon or silicone resins suitably used in the present invention is used in the insulation coating layer 36, it is preferable to form a primer layer suited to the types of the resin and ceramics used, for improving the adhesion with the underlying ceramics (the sensor substrate 7), and to form the insulation layer 36 on the primer layer.

Next, when a shield layer 37 comprising a conductive material is further formed on the insulation layer 36, in the case when the insulation layer 36 is made of a resin, since sintering is difficult, a method not requiring heat, such as sputtering, is used when various metallic materials are used as conductive members; however, when a conductive paste comprising metal powder and a resin is used, screen printing or coating can be used preferably. If the insulation layer 36 is made of glass, a conductive paste can be screen-printed, and sintered below a temperature at which the glass flows.

Finally, a catching substance or the like is applied to the diaphragm 2 or entire resonating portion to complete the mass sensor 40. The measurement of resonant frequencies is performed using an impedance analyzer or a network analyzer, or by the SINSWEEP system, or through the measurement of transfer functions by oscillating by external ultrasonic waves. Furthermore, change in the mass of the diaphragm 2 can be measured from change in the resonant frequencies.

Although the mass sensors of the present invention have been described in detail above, the mass sensors of the present invention can also be used for other applications by applying their measurement principle as described above. First, when the catching substance applied to the diaphragm is a moisture adsorbing material, the mass sensor can be used as a moisture meter. When applying to the diaphragm an adsorbing material that adsorbs a specific gaseous component, or an organic or inorganic substance as a catching substance, the mass sensor can be used as a gas sensor, an odor sensor, or a taste sensor. Furthermore, if the temperature of the diaphragm is controlled to make moisture condense, the mass sensor can be used as a dew indicator which measures the dew point from the temperature when the mass of the diaphragm is increased.

In addition, as a catching substance, magnetic material can be formed on the diaphragm in shape of a film so that taking advantage its magnetism various kinds of absorption sensor which can absorb substances on a selective bases. Here, the magnetic materials include in general metal elements of ferrite related materials (such as $M_1$:Mn, Fe, Co, Ni, Cr, Zn, Mg, Cd, Cu, Li, Y, and Gd, etc.) generally expressed as $M_1O\square Fe_2O_3$ or compounds of these elements (such as $M_1$: Mn—Zn, Ni—Zn, Mg—Mn, Ni—Cu, Cu—Zn, Li—Zn, Mg—Zn, etc.) and the metal elements of the permalloy related materials (such as $M_2$:Ta, Zr, Nb, Co, Mo, Cu, W, Mn, V, Cr, and Si, etc.) expressed as Fe—Ni or Fe—Ni—$M_2$ or compounds of these elements, and further Fe—Al—Si (sendust) related materials, Fe—(Ta, Zr, Nb)—X related materials (X:N, C, O), Fe—Co related materials, Fe—Cr—Co related materials, Co—Cr related materials, Co—Ni—Mn—P related materials, Fe—Al—Ni—Co—Ti—Cu related materials, or otherwise, $SmCo_5$ alloy, $Sm_2T_{17}$ alloy (T:3d transition element), rare-earth related materials such as $Nd_2Fe_{14}B$ alloy, etc. These materials can be shaped as a film such as sputtering, vacuum deposition, plating, CVD, etc.

The mass sensor can also be used as a film thickness gauge. The films that can be measured include sputtered films or CVD films formed in vacuum, LB films formed in gases, or electrodeposited films formed in liquids. When these films are formed, if the diaphragm or the resonating portion of the mass sensor is placed in the same film forming environment, a film is formed on the diaphragm or the resonating portion causing change in the mass, and change in resonant frequency, the thickness or the growing speed of the formed film can be measured.

Although a quartz vapor deposited film thickness gauge has been known to detect change in the resonant frequency of a quartz oscillator 81 similar to the one shown in FIG. 28 in the slipping direction (shear mode oscillation) when the film thickness changes, it has problems in that it is affected by change in temperature, noise due to the collision of impurities, and change in vacuum pressure, because the oscillator itself is used in a vapor deposition environment.

Whereas, if the mass sensor of the present invention is used in the v mode as a vapor deposited film thickness gauge, the resonating portion resists change in temperature because it oscillates in the rigid body mode of the diaphragm, the probability of the collision of impurities is low because the diaphragm is as thin as 3 to 20 $\mu$m, and a structure in which the resonating portion is easily held in a constant environment, the measurement accuracy can be improved compared with the case where a quartz oscillator 79 is used.

Furthermore, the mass sensor can be used as a viscosity meter to cause the shear waves of transverse waves to occur in a fluid when the diaphragm is immersed in the liquid, and receive the mass load of the portion where viscous waves enter. Here, when the v mode is used for measurement, since the portions other than the diaphragm are not required to be immersed in the liquid, the resonating portion resists change in temperature because it oscillates in the rigid body mode, and the probability of the collision of impurities is low because the diaphragm 19 is as thin as 3 to 20 $\mu$m, the measurement accuracy can be improved. Although a quartz viscosity meter for detecting change in the resonant frequency of a quartz oscillator in the slipping direction has also been used, it has problems in that it is affected by change in temperature, and noise due to the collision of impurities in the liquid, because the quartz oscillator itself is immersed in the liquid.

Furthermore, the quartz oscillator is used as a quartz vacuum gauge since its electric resistance varies due to the friction of gas molecules and the viscous friction of the gas in a vacuum. However, since this type of vacuum meter is used to measure change in frequencies due to the mass load effect of the quartz oscillator, the mass sensor 1 of the present invention utilizing basically the same measurement principle can also be used as a vacuum gauge.

Although a friction vacuum gauge using a quartz oscillator detects change in resistance when the tuning fork-shaped oscillator 79 is oscillated in the X-axis direction as FIG. 29 shows, it is difficult to decrease the thickness $d_1$ of the oscillator 79, and therefore, the improvement of sensitivity is difficult. Whereas, in the mass sensor, the thickness of the diaphragm 19 can be decreased to 3 to 20 $\mu$m, and the v mode can be used, sensitivity can be improved.

In addition, the mass sensor of the present invention can be used as a temperature sensor by using the bending mode of the diaphragm, that is, by sensing change in the Young's modulus as change in resonant frequency in the bending mode.

Although the mass sensor can be used as various sensors, the basic principle of measurement is to measure change in the resonant frequency of the resonating portion on the basis of the mass load to the diaphragm. Therefore, a plurality of sensor portions having different functions can be formed easily in one mass sensor. For example, the functions of a temperature sensor, a vacuum gauge, or a viscosity sensor can be added to the function as the mass sensor, that is, a sensor for referencing for the compensation of temperature, vacuum, or viscosity can be easily incorporated in the mass sensor. In such cases, since the use of a plurality of sensors having different shapes for different applications is unnecessary, it is also advantageous from the costs for the incorporation of sensors to the place of measurement and their handling, and for the measuring instruments.

In the above-described mass sensor of the present invention and mass sensors for other applications a piezoelectric transducer using a piezoelectric film that utilizes the piezoelectric effect is used as a device for sensing the oscillation of a resonating portion and inverting the oscillation to electric signals. However, such oscillation signal transducing devices are not limited to those utilizing the piezoelectric effect, but may be constituted by those utilizing electromagnetic induction, change in electrostatic capacity, change in incident light, change in electric resistance, or pyroelectricity.

For example, those utilizing electromagnetic induction include those having a coil installed on the sensing plate, an electric circuit for detecting electric signals flowing in the coil, and a magnet (may be an electromagnet) for generating a magnetic field in the coil. In this case, when the coil oscillates together with the resonating portion, an electric current flows through the coil due to electromagnetic induction, and the electric current is detected by the electric circuit. Those utilizing change in electrostatic capacity include those having a pair of electrodes installed on the surface of the sensing plate, a dielectric sandwiched by these electrodes, and an electric circuit connected to these electrodes, and detecting the electrostatic capacity charged in this specific space with the electric circuit.

Those utilizing change in incident light include those having a device for illuminating the resonating portion such as a photodiode, and a device (light receiver) for measuring the quantity of light reflected by the resonating portion. This light receiver may be a photo sensor. As the resonating portion oscillates, the quantity of light reflected by the resonating portion changes, and change in the quantity of the incident light is measured by the light receiver.

Those utilizing change in electric resistance are roughly divided into that using a conductor and that using a semiconductor. That using a conductor has a conductor provided on the surface of the resonating portion, and an electric circuit connected to the conductor. Since the conductor is distorted by oscillation when the conductor oscillates together with the resonating portion and its resistance changes, this change in resistance is detected by the electric circuit. That using a semiconductor uses a semiconductor in place of the conductor.

Those utilizing pyroelectricity include those comprising a pair of electrodes provided on the surface of the sensing plate, a pyroelectric member formed between these electrodes, an electronic circuit connected to the electrodes, and a heat source such as infrared ray, and detecting pyroelectric current generated by oscillation with the electronic circuit.

These types of oscillation signal transducers can be used in place of the piezoelectric elements described above, and in addition, different signal transducers can be used for the excitation of the resonating portion and for receiving the oscillation from the resonating portion separately. For example, a piezoelectric transducer can be used for driving, and an electrostatic capacity-type transducer for sensing. The arrangement of driving and sensing devices can be selected suitably and conveniently depending on the number of sensing plates. For example, when only one sensing plate is used, they can be arranged on the surface of the sensing plate; when two sensing plates are used, they can be arranged on both surfaces of the two, or on each surface.

Although the embodiments of mass sensors of the present invention have been described above, it is needless to say that the present invention is not limited to the above embodiments. Therefore, there are many other embodiments in which the features of the above-described embodiments are combined. Also, the embodiments of the present invention can be changed, modified, or improved on the basis of knowledge of those skilled in the art, unless these changes, modifications, or improvements deviate from the spirit of the present invention.

As described above, a mass sensor and a method for mass sensing of the present invention, exhibit excellent effects in that change in various extremely small masses occurring on a diaphragm, that is change in mass load on the diaphragm, can be sensed easily and accurately in a short time. Since the mass sensor of the present invention is hardly affected by the temperature of the specimen or change in the properties of materials for the mass sensor itself due to the temperature of the specimen on sensing resonant frequencies, and can measure an extremely small quantity of a 0.1 nanogram order as the nature of its structure, it exhibits an excellent effect. Also, the mass sensors of the present invention are advantageous in that the measuring sensitivity is improved and resonant frequencies are easily measured by the adoption of the rigid body mode and the optimal design of the shape of the connecting plates. Therefore, when a catching substance for catching various substances to be sensed is applied to the diaphragm, the mass sensor can be used as a gas sensor, taste sensor, odor sensor, immune sensor, or moisture meter, which can sense various chemical substances or microorganisms such as bacteria and viruses easily and quickly. Even when such a catching substance is not applied to the diaphragm, the mass sensor can be used as a film thickness gauge, viscosity meter, vacuum gauge, or thermometer. In addition, when the sensor is used as an immune sensor substituting the dyeing method, an odor sensor, or a taste sensor, the reliability of tests can be improved, because determination does not rely on human sense.

Furthermore, the mass sensor of the present invention has a feature in that a plurality of resonating portions used for sensing different physical and chemical quantities can be provided in a mass sensor easily. Therefore, since the use of a plurality of various discrete sensors is not required, the mass sensor of the present invention also excels in economic effects in the reduction of costs for incorporating the sensor in the measuring location, for facilities for handling or measuring such as measuring instruments, as well as the reduction of costs by the integration and the shared use of manufacturing equipment.

What is claimed is:

1. A mass sensor comprising:

a connecting plate having at least one of a slit, an opening portion, and a thin-walled portion and a thick-walled portion formed therein;

a diaphragm joined with the connecting plate at respective side surfaces thereof;

a sensing plate with a piezoelectric element being provided at least at one part on at least one surface of the sensing plate, which has its side surface joined with a side surface of said connecting plate in a direction perpendicular to the joining direction of said diaphragm and said connecting plate; and a sensor substrate with which at least a part of side surfaces of said connecting plate as well as said sensing plate are joined, wherein said diaphragm, said connecting plate, said sensing plate, and said piezoelectric element form a resonating portion.

2. A mass sensor comprising:

a connecting plate having at least one of a slit, an opening portion, and a thin-walled portion and a thick-walled portion formed therein;

a diaphragm joined with said connecting plate at respective side surfaces thereof;

two sensing plates with a piezoelectric element being provided at least at one part on at least one surface of at least one of said sensing plates, each of which has its side surface joined with a side surface of said connecting plate so as to sandwich the connecting plate in a direction perpendicular to the joining direction of said diaphragm and said connecting plate; and a sensor substrate with which at least a part of side surfaces of said connecting plate as well as said sensing plates are joined;

wherein said diaphragm, said connecting plate, said sensing plates, and said piezoelectric element form a resonating portion.

3. The mass sensor according to claim 2, wherein at least one slit is formed through at least one of said sensing plates in the direction perpendicular to the joining direction of said sensing plates and said connecting plate.

4. The mass sensor according to claim 2, wherein two piezoelectric elements respectively are provided on the surfaces of said two sensing plates facing the same direction, and the direction of polarization of a piezoelectric film of each of said piezoelectric elements is opposite.

5. A mass sensor comprising:

a sensor substrate;

two connecting plates each having at least one of a slit, an opening portion, and a thin-walled portion and a thick-walled portion formed therein;

a diaphragm joined with said connecting plates at respective side surfaces thereof, and being sandwiched by said connecting plates such that said connecting plates and said diaphragm bridge a gap between side surfaces of a recessed portion provided in said sensor substrate; and a sensing plate with a piezoelectric element being provided at least at one part on at least one surface of said sensing plate, which bridges a gap between a lower side surface of the recessed portion and a side surface of said respective connecting plate in a direction perpendicular to the joining direction of said connecting plate and said diaphragm, wherein said diaphragm, said connecting plate, said sensing plate, and said piezoelectric element form a resonating portion.

6. A mass sensor comprising:

a sensor substrate having a pair of recessed portions facing each other, each of said portions defined by a bottom surface and two side surfaces;

two connecting plates having at least one of a slit, an opening portion, and a thin-walled portion and a thick-walled portion formed therein;

a diaphragm joined with said connecting plates at respective side surfaces thereof, and being sandwiched by said connecting plates such that said connecting plates and said diaphragm bridge a gap between said bottom surfaces of said recessed portions; and four sensing plates with a piezoelectric element being provided at least at one part on at least one surface of two of said sensing plates which face each other with one of said connecting plates therebetween, said two of said sensing plates bridging a gap between side surfaces of one recessed portion and side surfaces of said connecting plate in a direction perpendicular to the joining direction of said connecting plate and said diaphragm;

wherein said diaphragm, said connecting plates, said sensing plates, and said piezoelectric elements form a resonating portion.

7. The mass sensor according to claim 6, wherein at least one slit is formed in one of said sensing plates that does not carry said piezoelectric element, in a direction perpendicular to the joining direction of said sensing plate and said connecting plate.

8. The mass sensor according to claim 6, wherein two piezoelectric elements are respectively provided on the surfaces of the two sensing plates facing each other via said connecting plate, and the direction of polarization of a piezoelectric film of each of said piezoelectric elements is opposite.

9. A mass sensor comprising:

a sensor substrate;

a first connecting plate and a second connecting plate having at least one of a slit, an opening portion, and a thin-walled portion and a thick-walled portion formed therein; and a first diaphragm joined with said first connecting plate at respective side surfaces thereof, and a second diaphragm joined with said second connecting plate at respective side surfaces thereof, between which connecting plates a first sensing plate is bridged;

wherein side surfaces of a second sensing plate, said first sensing plate, and said first connecting plate are joined to each other so that said first connecting plate is sandwiched by said second sensing plate and said first sensing plate, and a third sensing plate and said first sensing plate are joined with the second connecting plate so as to sandwich the second connecting plate at respective side surfaces thereof;

a piezoelectric element is provided at least on a part of at least one surface of said second sensing plate and said third sensing plate respectively; and bottom side surfaces of a recessed portion provided in said sensor substrate are joined with side surfaces of said first connecting plate and said second connecting plate, such that the side surfaces are opposed to joint side surfaces of the first diaphragm and the first connecting plate, and the second diaphragm and the second connecting plate, and said second sensing plate and said third sensing plate join with at least side surfaces of the recessed portion.

10. The mass sensor according to claim 9, wherein at least one slit is formed in said first sensing plate in a direction perpendicular to the bridging direction of said first sensing plate.

11. The mass sensor according to claim 1, wherein said connecting plate is formed by joining one thin plate and another plate or post-like spring plate having at least one of a slit and an opening portion formed therethrough.

12. The mass sensor according to claim 2, wherein said connecting plate is formed by joining one thin plate and another plate or post-like spring plate having at least one of a slit and an opening portion formed therethrough.

13. The mass sensor according to claim 5, wherein said connecting plates are formed by joining one thin plate and another plate or post-like spring plate having at least one of a slit and an opening portion formed therethrough.

14. The mass sensor according to claim 6, wherein said connecting plates are formed by joining one thin plate and another plate or post-like spring plate having at least one of a slit and an opening portion formed therethrough.

15. The mass sensor according to claim 9, wherein said connecting plates are formed by joining one thin plate and another plate or post-like spring plate having at least one of a slit and an opening portion formed therethrough.

16. The mass sensor according to claim 1, wherein said diaphragm, said connecting plate, said sensing plate, and said sensor substrate are integrally formed.

17. The mass sensor according to claim 2, wherein said diaphragm, said connecting plate, said sensing plates, and said sensor substrate are integrally formed.

18. The mass sensor according to claim 5, wherein said diaphragm, said connecting plates, said sensing plate, and said sensor substrate are integrally formed.

19. The mass sensor according to claim 6, wherein said diaphragm, said connecting plates, said sensing plates, and said sensor substrate are integrally formed.

20. The mass sensor according to claim 9, wherein said diaphragms, said connecting plates, said sensing plates, and said sensor substrate are integrally formed.

21. The mass sensor according to claim 11, wherein a portion of said connecting plate, said diaphragm, and said sensing plate are integrally formed from a thin vibrating plate, and another plate- or post-like spring plate forming said connecting plate is integrally formed from an intermediate plate, and said connecting plate is integrally formed by laminating said intermediate plate and said thin vibrating plate, and said sensor substrate is integrally formed by laminating said vibrating plate, said intermediate plate, and a base plate.

22. The mass sensor according to claim 12, wherein a portion of said connecting plate, said diaphragm, and said sensing plates are integrally formed from a thin vibrating plate, and another plate- or post-like spring plate forming said connecting plate is integrally formed from an intermediate plate, and said connecting plate is integrally formed by laminating said intermediate plate and said thin vibrating plate, and said sensor substrate is integrally formed by laminating said vibrating plate, said intermediate plate, and a base plate.

23. The mass sensor according to claim 13, wherein a portion of said connecting plates, said diaphragm, and said sensing plate are integrally formed from a thin vibrating plate, and another plate- or post-like spring plate forming said connecting plates is integrally formed from an intermediate plate, and said connecting plates are integrally formed by laminating said intermediate plate and said thin vibrating plate, and said sensor substrate is integrally formed by laminating said vibrating plate, said intermediate plate, and a base plate.

24. The mass sensor according to claim 14, wherein a portion of said connecting plates, said diaphragm, and said sensing plates are integrally formed from a thin vibrating plate, and another plate- or post-like spring plate forming said connecting plates is integrally formed from an intermediate plate, and said connecting plates are integrally formed by laminating said intermediate plate and said thin vibrating plate, and said sensor substrate is integrally formed by laminating said vibrating plate, said intermediate plate, and a base plate.

25. The mass sensor according to claim 15, wherein a portion of said connecting plates, said diaphragms, and said sensing plates are integrally formed from a thin vibrating plate, and another plate- or post-like spring plate forming said connecting plates is integrally formed from an intermediate plate, and said connecting plates are integrally formed by laminating said intermediate plate and said vibrating plate, and said sensor substrate is integrally formed by laminating said vibrating plate, said intermediate plate, and a base plate.

26. The mass sensor according to claim 1, wherein the thickness of the thin-walled portion of said connecting plate is thicker than the thickness of one of said diaphragm and said sensing plate.

27. The mass sensor according to claim 2, wherein the thickness of the thin-walled portion of said connecting plate is thicker than the thickness of one of said diaphragm and said sensing plates.

28. The mass sensor according to claim 5, wherein the thickness of the thin-walled portion of said connecting plates is thicker than the thickness of one of said diaphragm and said sensing plate.

29. The mass sensor according to claim 6, wherein the thickness of the thin-walled portion of said connecting plates is thicker than the thickness of one of said diaphragm and said sensing plates.

30. The mass sensor according to claim 9, wherein the thickness of the thin-walled portion of said connecting plates is thicker than the thickness of one of said diaphragms and said sensing plates.

31. The mass sensor according to claim 26, wherein the thickness of the thin-walled portion of said connecting plate is thicker than the thickness of said sensing plate and of said piezoelectric element.

32. The mass sensor according to claim 27, wherein the thickness of the thin-walled portion of said connecting plate is thicker than the thickness of said sensing plates and of said piezoelectric element.

33. The mass sensor according to claim 28, wherein the thickness of the thin-walled portion of said connecting plates is thicker than the thickness of said sensing plate and of said piezoelectric element.

34. The mass sensor according to claim 29, wherein the thickness of the thin-walled portion of said connecting plates is thicker than the thickness of said sensing plates and of said piezoelectric element.

35. The mass sensor according to claim 30, wherein the thickness of the thin-walled portion of said connecting plates is thicker than the thickness of said sensing plates and of said piezoelectric element.

36. The mass sensor according to claim 1, further comprising at least one recessed portion or through hole, and said resonating portion is formed on each inner circumferential surface of at least one recessed portion or through hole formed through said sensor substrate.

37. The mass sensor according to claim 2, further comprising at least one recessed portion or through hole, and said resonating portion is formed on each inner circumferential surface of at least one recessed portion or through hole formed through said sensor substrate.

38. The mass sensor according to claim 5, further comprising at least one recessed portion or through hole, and said resonating portion is formed on each inner circumferential surface of at least one recessed portion or through hole formed through said sensor substrate.

39. The mass sensor according to claim 6, further comprising at least one recessed portion or through hole, and said resonating portion is formed on each inner circumferential surface of at least one recessed portion or through hole formed through said sensors substrate.

40. The mass sensor according to claim 9, further comprising at least one recessed portion or through hole, and said resonating portion is formed on each inner circumferential surface of at least one recessed portion or through hole formed through said sensor substrate.

41. The mass sensor according to claim 1, wherein a catching substance reacting with and catching only a substance to be sensed is applied on said diaphragm, the resonant frequencies of said resonating portion are measured by said piezoelectric element in the state where said substance to be sensed has not been caught by said catching substance, and in the state after said substance to be sensed has been caught by said catching substance, and the mass of said substance to be sensed having been caught is measured from a change in the measured resonant frequencies.

42. The mass sensor according to claim 2, wherein a catching substance reacting with and catching only a substance to be sensed is applied on said diaphragm, the resonant frequencies of said-resonating portion are measured by said piezoelectric element in the state where said substance to be sensed has not been caught by said catching substance, and in the state after said substance to be sensed has been caught by said catching substance, and the mass of said substance to be sensed having been caught is measured from a change in the measured resonant frequencies.

43. The mass sensor according to claim 5, wherein a catching substance reacting with and catching only a substance to be sensed is applied on said diaphragm, the resonant frequencies of said resonating portion are measured by said piezoelectric element in the state where said substance to be sensed has not been caught by said catching substance, and in the state after said substance to be sensed has been caught by said catching substance, and the mass of said substance to be sensed having been caught is measured from a change in the measured resonant frequencies.

44. The mass sensor according to claim 6, wherein a catching substance reacting with and catching only a substance to be sensed is applied on said diaphragm, the resonant frequencies of said resonating portion are measured by said piezoelectric element in the state where said substance to be sensed has not been caught by said catching substance, and in the state after said substance to be sensed has been caught by said catching substance, and the mass of said substance to be sensed having been caught is measured from a change in the measured resonant frequencies.

45. The mass sensor according to claim 9, wherein a catching substance reacting with and catching only a substance to be sensed is applied on at least one of said diaphragms, the resonant frequencies of said resonating portion are measured by said piezoelectric element in the state where said substance to be sensed has not been caught by said catching substance, and in the state after said substance to be sensed has been caught by said catching substance, and the mass of said substance to be sensed having been caught is measured from a change in the measured resonant frequencies.

46. The mass sensor according to claim 41, wherein said mass sensor has at least a plurality of said diaphragms, and said catching substance is not applied to at least one of said diaphragms.

47. The mass sensor according to claim 42, wherein said mass sensor has at least a plurality of said diaphragms, and said catching substance is not applied to at least one of said diaphragms.

48. The mass sensor according to claim 43, wherein said mass sensor has at least a plurality of said diaphragms, and said catching substance is not applied to at least one of said diaphragms.

49. The mass sensor according to claim 44, wherein said mass sensor has at least a plurality of said diaphragms, and said catching substance is not applied to at least one of said diaphragms.

50. The mass sensor according to claim 45, wherein said mass sensor has at least a plurality of said diaphragms, and said catching substance is not applied to at least one of said diaphragms.

51. The mass sensor according to claim 41, wherein said mass sensor comprises at least a plurality of diaphragms, and different types of catching substances are applied to each of said diaphragms.

52. The mass sensor according to claim 42, wherein said mass sensor comprises at least a plurality of diaphragms, and different types of catching substances are applied to each of said diaphragms.

53. The mass sensor according to claim 43, wherein said mass sensor comprises at least a plurality of diaphragms, and different types of catching substances are applied to each of said diaphragms.

54. The mass sensor according to claim 44, wherein said mass sensor comprises at least a plurality of diaphragms, and different types of catching substances are applied to each of said diaphragms.

55. The mass sensor according to claim 45, wherein said mass sensor comprises at least a plurality of diaphragms, and different types of catching substances are applied to each of said diaphragms.

56. The mass sensor according to claim 1, further comprising a plurality of said connecting plates, a plurality of said diaphragms, a plurality of said sensing plates and a plurality of said piezoelectric elements forming a plurality of resonating portions, wherein said resonating portions are provided at least at two or more places on said sensor substrate so as to increase the dynamic range by integrating signals derived from said respective resonating portions.

57. The mass sensor according to claim 2, further comprising a plurality of said connecting plates, a plurality of said diaphragms, a plurality of said sensing plates and a plurality of said piezoelectric elements forming a plurality of resonating portions, wherein said resonating portions are provided at least at two or more places on said sensor substrate so as to increase the dynamic range by integrating signals derived from said respective resonating portions.

58. The mass sensor according to claim 5, further comprising a plurality of said connecting plates, a plurality of said diaphragms, a plurality of said sensing plates and a plurality of said piezoelectric elements forming a plurality of resonating portions, wherein said resonating portions are provided at least at two or more places on said sensor substrate so as to increase the dynamic range by integrating signals derived from said respective resonating portions.

59. The mass sensor according to claim 6, further comprising a plurality of said connecting plates, a plurality of said diaphragms, a plurality of said sensing plates and a plurality of said piezoelectric elements forming a plurality of resonating portions, wherein said resonating portions are provided at least at two or more places on said sensor substrate so as to increase the dynamic range by integrating signals derived from said respective resonating portions.

60. The mass sensor according to claim 9, further comprising a plurality of said connecting plates, a plurality of said diaphragms, a plurality of said sensing plates and a plurality of said piezoelectric elements forming a plurality of resonating portions, wherein said resonating portions are provided at least at two or more places on said sensor substrate so as to increase the dynamic range by integrating signals derived from said respective resonating portions.

61. The mass sensor according to claim 1, wherein said piezoelectric element is divided into two, and one is used for driving and the other is used for sensing.

62. The mass sensor according to claim 2, wherein said piezoelectric element is divided into two, and one is used for driving and the other is used for sensing.

63. The mass sensor according to claim 5, wherein said piezoelectric element is divided into two, and one is used for driving and the other is used for sensing.

64. The mass sensor according to claim 6, wherein at least one of said piezoelectric elements is divided into two, and one is used for driving and the other is used for sensing.

65. The mass sensor according to claim 9, wherein said piezoelectric element is divided into two, and one is used for driving and the other is used for sensing.

66. The mass sensor according to claim 1, wherein two piezoelectric elements are provided at said resonating portion, and one of said piezoelectric elements is used for driving and the other of said piezoelectric elements is used for sensing.

67. The mass sensor according to claim 2, wherein two piezoelectric elements are provided at said resonating portion, and one of said piezoelectric elements is used for driving and the other of said piezoelectric elements is used for sensing.

68. The mass sensor according to claim 5, wherein two piezoelectric elements are provided at said resonating portion, and one of said piezoelectric elements is used for driving and the other of said piezoelectric elements is used for sensing.

69. The mass sensor according to claim 6, wherein two piezoelectric elements are provided at said resonating portion, and one of said piezoelectric elements is used for driving and the other of said piezoelectric elements is used for sensing.

70. The mass sensor according to claim 9, wherein two piezoelectric elements are provided at said resonating portion, and one of said piezoelectric elements is used for driving and the other of said piezoelectric elements is used for sensing.

71. The mass sensor according to claim 1, wherein a piezoelectric element for sensing is provided on a surface of said connecting plate.

72. The mass sensor according to claim 2, wherein a piezoelectric element for sensing is provided on a surface of said connecting plate.

73. The mass sensor according to claim 5, wherein a piezoelectric element for sensing is provided on a surface of at least one of said connecting plates.

74. The mass sensor according to claim 6, wherein a piezoelectric element for sensing is provided on a surface of at least one of said connecting plates.

75. The mass sensor according to claim 9, wherein a piezoelectric element for sensing is provided on a surface of at least one of said connecting plates.

76. The mass sensor according to claim 1, wherein a position sensor consisting of a pair of electrodes is provided on a middle position between said diaphragm and said piezoelectric element on said sensor substrate.

77. The mass sensor according to claim 2, wherein a position sensor consisting of a pair of electrodes is provided on a middle position between said diaphragm and said piezoelectric element on said sensor substrate.

78. The mass sensor according to claim 5, wherein a position sensor consisting of a pair of electrodes is provided on a middle position between said diaphragm and said piezoelectric element on said sensor substrate.

79. The mass sensor according to claim 6, wherein a position sensor consisting of a pair of electrodes is provided on a middle position between said diaphragm and said piezoelectric element on said sensor substrate.

80. The mass sensor according to claim 9, wherein a position sensor consisting of a pair of electrodes is provided on a middle position between said diaphragms and said piezoelectric element on said sensor substrate.

81. The mass sensor according to claim 1, wherein said piezoelectric element, and electrode leads respectively connected to the electrode of said piezoelectric element are coated with a resin or glass insulation coating layer.

82. The mass sensor according to claim 2, wherein said piezoelectric element, and electrode leads respectively connected to the electrode of said piezoelectric element are coated with a resin or glass insulation coating layer.

83. The mass sensor according to claim 5, wherein said piezoelectric element, and electrode leads respectively connected to the electrode of said piezoelectric element are coated with a resin or glass insulation coating layer.

84. The mass sensor according to claim 6, wherein said piezoelectric element, and electrode leads respectively connected to the electrode of said piezoelectric element are coated with a resin or glass insulation coating layer.

85. The mass sensor according to claim 9, wherein said piezoelectric element, and electrode leads respectively connected to the electrode of said piezoelectric element are coated with a resin or glass insulation coating layer.

86. The mass sensor according to claim 81, wherein said resin is fluorocarbon resin or silicone resin.

87. The mass sensor according to claim 82, wherein said resin is fluorocarbon resin or silicone resin.

88. The mass sensor according to claim 83, wherein said resin is fluorocarbon resin or silicone resin.

89. The mass sensor according to claim 84, wherein said resin is fluorocarbon resin or silicone resin.

90. The mass sensor according to claim 85, wherein said resin is fluorocarbon resin or silicone resin.

91. The mass sensor according to claim 81, wherein a shield layer consisting of a conductive member is formed on at least a part of the surface of said insulation layer.

92. The mass sensor according to claim 82, wherein a shield layer consisting of a conductive member is formed on at least a part of the surface of said insulation layer.

93. The mass sensor according to claim 83, wherein a shield layer consisting of a conductive member is formed on at least a part of the surface of said insulation layer.

94. The mass sensor according to claim 84, wherein a shield layer consisting of a conductive member is formed on at least a part of the surface of said insulation layer.

95. The mass sensor according to claim 85, wherein a shield layer consisting of a conductive member is formed on at least a part of the surface of said insulation layer.

96. The mass sensor according to claim 1, wherein said sensor substrate, said diaphragm, said connecting plate, and said sensing plate are fabricated using completely stabilized zirconia or partially stabilized zirconia.

97. The mass sensor according to claim 2, wherein said sensor substrate, said diaphragm, said connecting plate, and said sensing plates are fabricated using completely stabilized zirconia or partially stabilized zirconia.

98. The mass sensor according to claim 5, wherein said sensor substrate, said diaphragm, said connecting plates, and said sensing plate are fabricated using completely stabilized zirconia or partially stabilized zirconia.

99. The mass sensor according to claim 6, wherein said sensor substrate, said diaphragm, said connecting plates, and said sensing plates are fabricated using completely stabilized zirconia or partially stabilized zirconia.

100. The mass sensor according to claim 9, wherein said sensor substrate, said diaphragms, said connecting plates, and said sensing plates are fabricated using completely stabilized zirconia or partially stabilized zirconia.

101. The mass sensor according to claim 1, wherein a piezoelectric film of said piezoelectric element is a material consisting mainly of lead zirconate, lead titanate, or lead magnesium niobate.

102. The mass sensor according to claim 2, wherein a piezoelectric film of said piezoelectric element is a material consisting mainly of lead zirconate, lead titanate, or lead magnesium niobate.

103. The mass sensor according to claim 5, wherein a piezoelectric film of said piezoelectric element is a material consisting mainly of lead zirconate, lead titanate, or lead magnesium niobate.

104. The mass sensor according to claim 6, wherein a piezoelectric film of said piezoelectric element is a material consisting mainly of lead zirconate, lead titanate, or lead magnesium niobate.

105. The mass sensor according to claim 9, wherein a piezoelectric film of said piezoelectric element is a material consisting mainly of lead zirconate, lead titanate, or lead magnesium niobate.

106. A mass sensing method comprising:
   providing a mass sensor comprising:
      a sensor substrate, a connecting plate having at least one of a slit, an opening portion, and a thin-walled portion and a thick-walled portion formed in the connecting plate, a diaphragm being joined with the connecting plate at respective side surfaces thereof, at least one sensing plate joined with the connecting plate at respective side surfaces thereof, at least one portion of the side surfaces of said connecting plate and said sensing plate being joined with a portion of side surfaces of the sensor substrate, and a piezoelectric element provided on at least a part of said sensing plate; and measuring the resonant frequency of said mass sensor by using said piezoelectric element at least based either on v mode swing oscillation or vz mode swing oscillation, v mode swing oscillation involving straight-line like reciprocal oscillation of said diaphragm with a perpendicular axis passing through perpendicularly at the center of joint surfaces of said connecting plate and said sensor substrate being the center, in a direction in parallel with the surface of said diaphragm and perpendicular with said perpendicular axis, and vz mode swing oscillation involving swing-like reciprocal oscillation of said diaphragm with said perpendicular axis being the center, in a direction in parallel with the surface of said diaphragm and perpendicular with said perpendicular axis, accompanied by movement in a direction perpendicular with the surface of said diaphragm.

107. A mass sensor comprising:

a sensor substrate;

a connecting plate having a first end joined to said sensor substrate and a second end opposed to said first end along a first direction, said connecting plate having at least one of (i) a slit therethrough, (ii) an opening therethrough, and (iii) a thin-walled portion and a thick-walled portion formed therein;

a diaphragm joined to said second end of said connecting plate;

a sensing plate having a first side joined to a side of said connecting plate and a second side opposed to said first side along a second direction substantially perpendicular to said first direction, said second side being joined to said sensor substrate; and a piezoelectric element disposed on at least a portion of at least one of opposed main surfaces of said sensing plate;

wherein said connecting plate, said diaphragm, said sensing plate and said piezoelectric element form a resonating portion.

* * * * *